(12) United States Patent
Gyota

(10) Patent No.: US 11,349,337 B2
(45) Date of Patent: May 31, 2022

(54) ENERGY SETTING DEVICE, ENERGY SETTING METHOD, AND RECORDING MEDIUM

(71) Applicant: Mitsubishi Electric Corporation, Tokyo (JP)

(72) Inventor: Tomoaki Gyota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/045,927

(22) PCT Filed: Jun. 27, 2018

(86) PCT No.: PCT/JP2018/024473
§ 371 (c)(1),
(2) Date: Oct. 7, 2020

(87) PCT Pub. No.: WO2020/003427
PCT Pub. Date: Jan. 2, 2020

(65) Prior Publication Data
US 2021/0313831 A1    Oct. 7, 2021

(51) Int. Cl.
*H02J 13/00* (2006.01)
*H02J 3/00* (2006.01)
(Continued)

(52) U.S. Cl.
CPC ........ *H02J 13/00002* (2020.01); *H02J 3/003* (2020.01); *H02J 13/00004* (2020.01);
(Continued)

(58) Field of Classification Search
CPC ............ H02J 13/00004; H02J 2310/60; Y02B 70/3225; Y02B 70/30; Y04S 20/242;
(Continued)

(56) References Cited

U.S. PATENT DOCUMENTS

| 8,006,108 B2* | 8/2011 | Brey ..................... G06F 1/3203 713/320 |
| 2004/0153170 A1* | 8/2004 | Santacatterina .......... H02J 3/14 700/1 |

(Continued)

FOREIGN PATENT DOCUMENTS

| JP | 2016-077090 A | 5/2016 |
| JP | 2017-050919 A | 3/2017 |
| WO | 2013/121700 A1 | 8/2013 |

*Primary Examiner* — Darrin D Dunn
(74) *Attorney, Agent, or Firm* — Posz Law Group, PLC

(57) ABSTRACT

A reduction instruction receiver receives a reduction instruction for energy from a server. An energy setter sets, when the reduction instruction receiver receives the reduction instruction, individual target energies for the respective subsystems, the individual target energies each being a target value of a consumption energy for a corresponding subsystem such that (i) a total of individual target energies that are target values of consumption energies for the respective subsystems is smaller than a total target energy that is a target value of a consumption energy of an entirety of the subsystems, and (ii) a higher correlation among consumption energies of the respective subsystems provides an increase in a total margin energy, the total margin energy being a difference between the total target energy and the sum of the individual target energies. The control-instruction transmitter transmits control-instruction information for control of the facility device based on the set individual target energies.

18 Claims, 13 Drawing Sheets

(51) Int. Cl.
*G05D 23/19* (2006.01)
*G05D 25/02* (2006.01)
*G05D 27/02* (2006.01)

(52) U.S. Cl.
CPC ......... *G05D 23/1951* (2013.01); *G05D 25/02* (2013.01); *G05D 27/02* (2013.01); *H02J 2310/12* (2020.01); *H02J 2310/60* (2020.01)

(58) Field of Classification Search
CPC ......... Y04S 20/00; Y04S 20/30; G05B 15/02; G05B 2219/2639; G05B 2219/2642; G05B 13/02; G06F 1/3203; Y02D 10/00; Y02D 10/22; Y02D 10/24; Y02D 10/14; Y02D 10/171; Y02D 30/70
See application file for complete search history.

(56) References Cited

U.S. PATENT DOCUMENTS

| | | | |
|---|---|---|---|
| 2010/0030392 A1* | 2/2010 | Ferentz | H04L 12/10 700/295 |
| 2013/0103968 A1* | 4/2013 | Conroy | G06F 1/3296 713/340 |
| 2013/0318371 A1* | 11/2013 | Hormuth | G06F 1/28 713/320 |
| 2015/0167997 A1* | 6/2015 | Saffre | F24F 11/30 700/276 |

* cited by examiner

FIG. 4

ENERGY HISTORY INFORMATION

| PERIOD | CONSUMPTION ENERGY (kWh) | |
| --- | --- | --- |
| | AIR CONDITIONING SYSTEM | LIGHTING SYSTEM |
| 2018/05/15 10:00-10:30 | Wa1 | Wb1 |
| 2018/05/15 09:30-10:00 | Wa2 | Wb2 |
| 2018/05/15 09:00-09:30 | Wa3 | Wb3 |
| 2018/05/15 08:30-09:00 | Wa4 | Wb4 |
| 2018/05/15 08:00-08:30 | Wa5 | Wb5 |
| 2018/05/15 07:30-08:00 | Wa6 | Wb6 |
| ... | ... | ... |
| 2018/04/15 10:30-11:00 | Wa1440 | Wb1440 |

ENERGY SETTING DEVICE, ENERGY SETTING METHOD, AND RECORDING MEDIUM

CROSS REFERENCE TO RELATED APPLICATION

This application is a U.S. national stage application of PCT/JP2018/024473 filed on Jun. 27, 2018, the contents of which are incorporated herein by reference.

TECHNICAL FIELD

The present disclosure relates to an energy setting device, an energy setting method, and a program.

BACKGROUND ART

In recent years, demand response is being investigated as a system for balancing the receiving and supplying of power. Demand response is a system in which a consumer adjusts power consumption occurring in a demand region in accordance with an adjustment request from a power industry operator. The adjustment request is mainly a request to suppress the power consumption occurring in the demand region. The adjustment request, for example, provides notification to a control device that controls facility device within the demand region.

For example, in Patent Literature 1, technology is described that operates various load equipment units such that a consumable upper limit power value set by demand response is not exceeded in a demand region that has multiple types of load equipment such as air conditioners and lighting equipment units. The technology described in Patent Literature 1, allocates distribution power to the various load equipment units so that the consumable upper limit power value is not exceeded, and operates each load equipment unit within the allocated distribution power.

CITATION LIST

Patent Literature

Patent Literature 1: International Publication No. WO 2013/121700.

SUMMARY OF INVENTION

Technical Problem

For the technology described in Patent Literature 1, a method exists that, for example, increases a margin of a power value set between a sum of the distribution power and the consumable upper limit power value as a method for decreasing risk that the power consumption in the demand region exceeds the consumable upper limit power value. In other words, this is a method that increases the margin of energy set between the sum of distribution energies corresponding to the distribution power and the consumable upper limit energy corresponding to the consumable upper limit power value. However, the possibility of a decline in convenience or comfort increases with increase in the margin of the energy. Technology therefore is desired that sets the margin of the energy appropriately, and responds appropriately to the reduction instruction for the energy.

In consideration of the aforementioned problem, an object of the present disclosure is to provide an energy setting device, an energy setting method, and a program that respond appropriately the reduction instruction of the energy.

Solution to Problem

In order to achieve the aforementioned object, an energy setting device according to the present disclosure includes:
reduction-instruction receiving means for receiving a reduction instruction for reduction in electrical energy of an entirety of subsystems, each subsystem comprising a facility device and a control device configured to control the facility device:
energy setting means for setting, when the reduction-instruction receiving means receives the reduction instruction, individual target energies for the respective subsystems, the individual target energies each being a target value of a consumption energy for a corresponding subsystem of the subsystems, such that (i) a sum of the individual target energies is less than a total target energy that is a target value of a consumption energy of the entirety of the subsystems, and (ii) a higher correlation among consumption energies of the respective subsystems provides an increase in a total margin energy, the total margin energy being a difference between the total target energy and the sum of the individual target energies; and
control-instruction transmitting means for transmitting, to the control device, control-instruction information for instruction of control of the facility device based on the individual target energies set by the energy setting means.

Advantageous Effects of Invention

Per the present disclosure, the individual target energies are set such that (i) a sum of the individual target energies is less than the total target energy, and (ii) a higher correlation among consumption energies of the respective subsystems provides an increase in the total margin energy, the total margin energy being the difference between the total target energy and the sum of the individual target energies. Therefore, the present disclosure enables appropriate response to the reduction instruction for the energy.

BRIEF DESCRIPTION OF DRAWINGS

FIG. 4 is a drawing illustrating energy history information;

DESCRIPTION OF EMBODIMENTS

Embodiment 1

Figure 1:
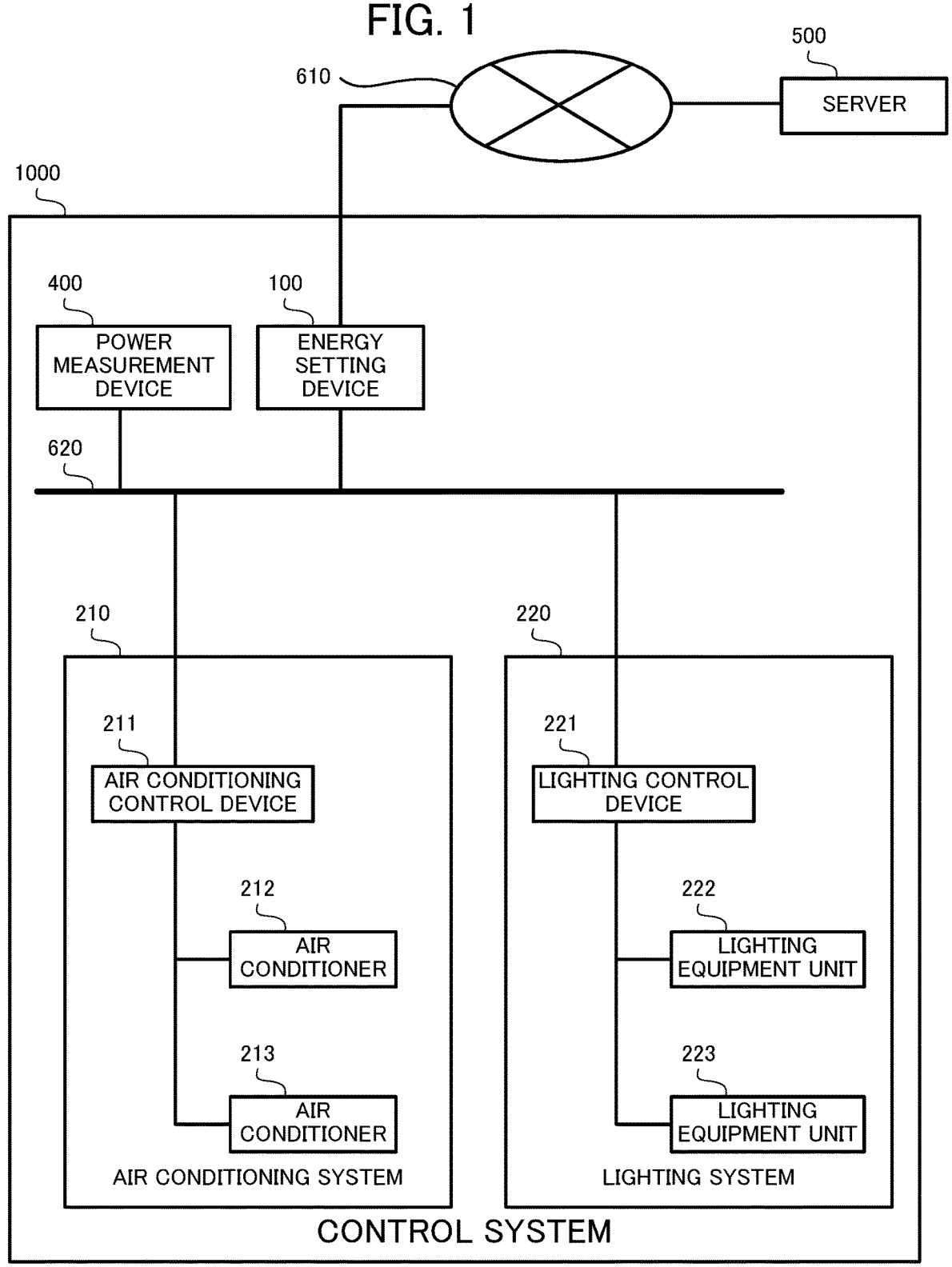
FIG. 1 is a system configuration drawing of a control system according to Embodiment 1 of the present disclosure.

Firstly, configuration of a control system 1000 according to Embodiment 1 of the present disclosure is described with reference to FIG. 1. The control system 1000 is, for example, a system that includes multiple subsystems that are each equipped with a facility device and a control device. As illustrated in FIG. 1, the control system 1000 is equipped with an energy setting device 100, an air conditioning system 210, a lighting system 220, and a power measurement device 400. The air conditioning system 210 is equipped with an air conditioning control device 211, an air conditioner 212, and an air conditioner 213. The lighting system 220 is equipped with a lighting control device 221, a lighting equipment unit 222, and a lighting equipment unit 223. The energy setting device 100 and a server 500 are interconnected via a communication network 610. An example of the communication network 610 is the Internet. The energy setting device 100, the air conditioning control device 211, and the lighting control device 221 are interconnected via a communication network 620. An example of the communication network 620 is a wireless local area network (LAN) installed within a building.

The energy setting device 100 is a device that, upon reception of a reduction instruction for total consumption energy that is a consumption energy for the entirety of the control system 1000, sets each type of the energy so as to appropriately reduce the total consumption energy. Appropriately reducing the total consumption energy means, for example, causing a reduction amount of the total consumption energy to be within an appropriate range. Furthermore, comfort or convenience are thought to decline when the reduction amount of the total consumption energy is excessive, and an excessively small reduction amount in the total consumption energy is considered to run counter to the reduction instruction. The "consumption energy" in the present embodiment is basically the consumption energy per a predetermined period, such as per hour or per 30 minutes.

In the present embodiment, the energy setting device 100 is taken to receive, from the server 500, a reduction instruction according to a demand response designating a total target energy. The "total target energy" is a target value of the consumption energy of the entirety of the control system 1000, that is, the target value of the consumption energy of the entirety of the subsystems with which the control system 1000 is equipped. Here, the energy setting device 100 sets individual target energies such that a sum of the individual target energies is smaller than the total target energy. The "individual target energy" is the target value of the consumption energy for each of the subsystems. In this manner, even if the consumption energy of a given subsystem exceeds the individual target energy for some reason, the energy setting device 100 immediately causes a margin to be maintained in the energy such that the consumption energy of the entirety of the control system 1000 does not exceed the total target energy.

Moreover, the energy setting device 100 is configured such that a higher correlation among the consumption energies of the respective subsystems provides an increase in a total margin energy. The "total margin energy" is a difference between the sum of the individual target energies and the total target energies. Specifically, the energy setting device 100 is configured such that a larger correlation coefficient among the individual energy histories provides an increase in a total margin energy. The "individual energy histories" are histories of the consumption energies for respective subsystems, and are time series data of measurement values of the consumption energies for each of the subsystems. In this manner, a higher correlation between the subsystems with respect to the consumption energy provides an increase in width of the margin. The reason why such configuration is used is that the consumption energies of the subsystems are more easily linked to one another with increase in the correlation and thus the consumption energy of the entirety of the control system 1000 more easily exceeds the total target energy.

Figure 2:
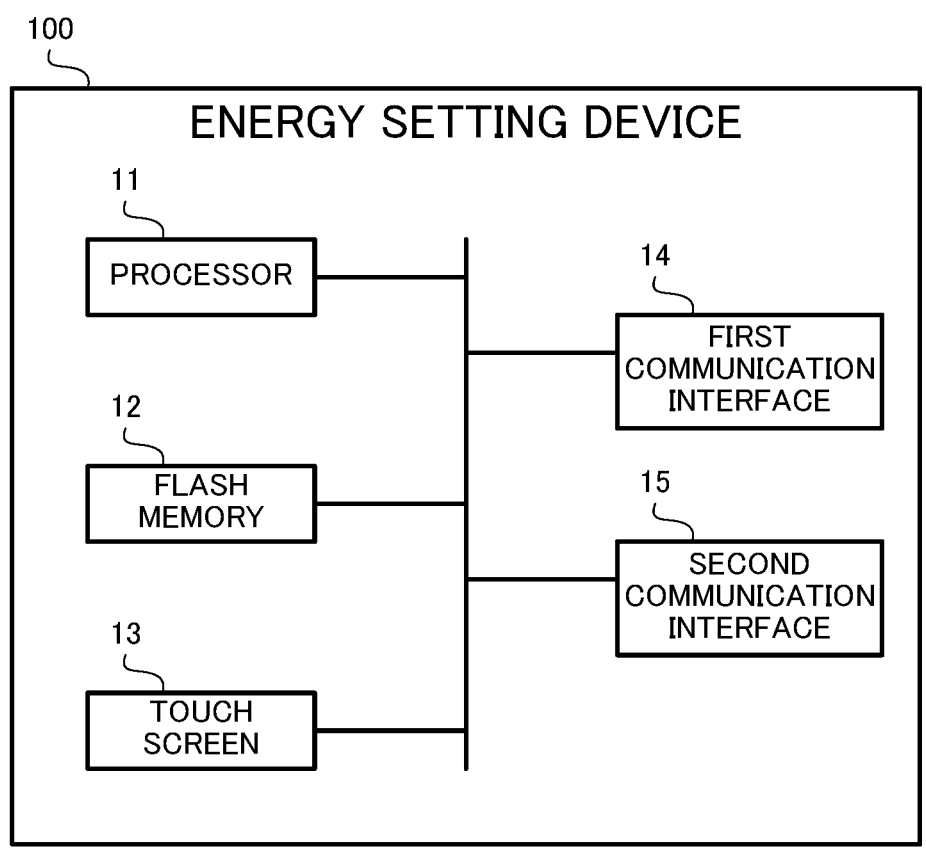
FIG. 2 is a system configuration drawing of an energy setting device according to Embodiment 1 of the present disclosure.

Configuration of the energy setting device 1X) is described below with reference to FIG. 2. As illustrated in FIG. 2, the energy setting device 100 is equipped with a processor 11, a flash memory 12, a touch screen 13, a first communication interface 14, and a second communication interface 15. The processor 11 controls overall operation of the energy setting device 100. The processor 11, for example, is a central processing unit (CPU) that contains components such as a read only memory (ROM), a random-access memory (RAM), and a real time clock (RTC). The CPU, foe example, operates in accordance with a basic program stored in the ROM and uses the RAM as a work area.

The flash memory 12 is a non-volatile memory that stores various types of information. The flash memory 12, for example, stores programs for execution by the processor 11. The touch screen 13 senses an operation performed by a user and supplies to the processor 11 signals indicating a result of the sensing. Moreover, the touch screen 13 displays information in accordance with control by the processor 11. The first communication interface 14 is a communication interface for connecting the energy setting device 100 to the communication network 610. The second communication interface 15 is a communication interface for connecting the energy setting device 100 to the communication network 620.

The air conditioning control device 211 controls the air conditioner 212 and the air conditioner 213. The air conditioning control device 211, upon receiving control-instruction information from the energy setting device 100, controls the air conditioner 212 and air conditioner 213 such that the consumption energy of the air conditioning system 210 becomes the individual target energy. The control-instruction information is information that includes the individual target energy, and is information giving an instruction for control of the facility device based on the individual target energy. The consumption energy of the air conditioning system 210 is basically a sum of the consumption energy of the air conditioner 212 and the consumption energy of the air conditioner 213. The air conditioning control device 211 has a function for connecting to the communication network 620.

The lighting control device 221 controls the lighting equipment unit 222 and the lighting equipment unit 223. Upon receiving the control-instruction information from the energy setting device 100, the lighting control device 221 controls the lighting equipment unit 222 and the lighting equipment unit 223 such that the consumption energy of the lighting system 220 becomes the individual target energy. The consumption energy of the lighting system 220 is basically a sum of the consumption energy of the lighting equipment unit 222 and the consumption energy of the lighting equipment unit 223. The lighting control device 221 has a function for connection to the communication network 620.

The power measurement device 400 measures the consumption energy of the air conditioning system 210 over a predetermined cycle time, and measures the consumption energy of the air conditioning system 210 for each fixed period. Moreover, the power measurement device 400 measures the power consumption of the lighting system 220 over the predetermined cycle time, and measures the consumption energy of the lighting system 220 for each fixed period. The power measurement device 400 transmits to the energy setting device 100 consumption energy information indicating the consumption energy of the air conditioning system 210 and identification information of the air conditioning system 210.

Moreover, the power measurement device 400 transmits to the energy setting device 100 consumption energy information indicating the consumption energy of the lighting system 220 and identification information of the lighting system 220. The power measurement device 400 has a function for connecting to the communication network 620. The power measurement device 400, for example, is equipped with a current transformer.

The server 500 provides instruction for a consumer to reduce the energy based on power supply and demand conditions. For example, the server 500, via the communication network 610, transmits to the energy setting device 100 reduction instruction information indicating a reduction instruction for energy and designating the total target energy. The server 500, for example, is a server possessed by a power company or an aggregator. The server 500 has a function for connecting to the communication network 610.

Figure 3:
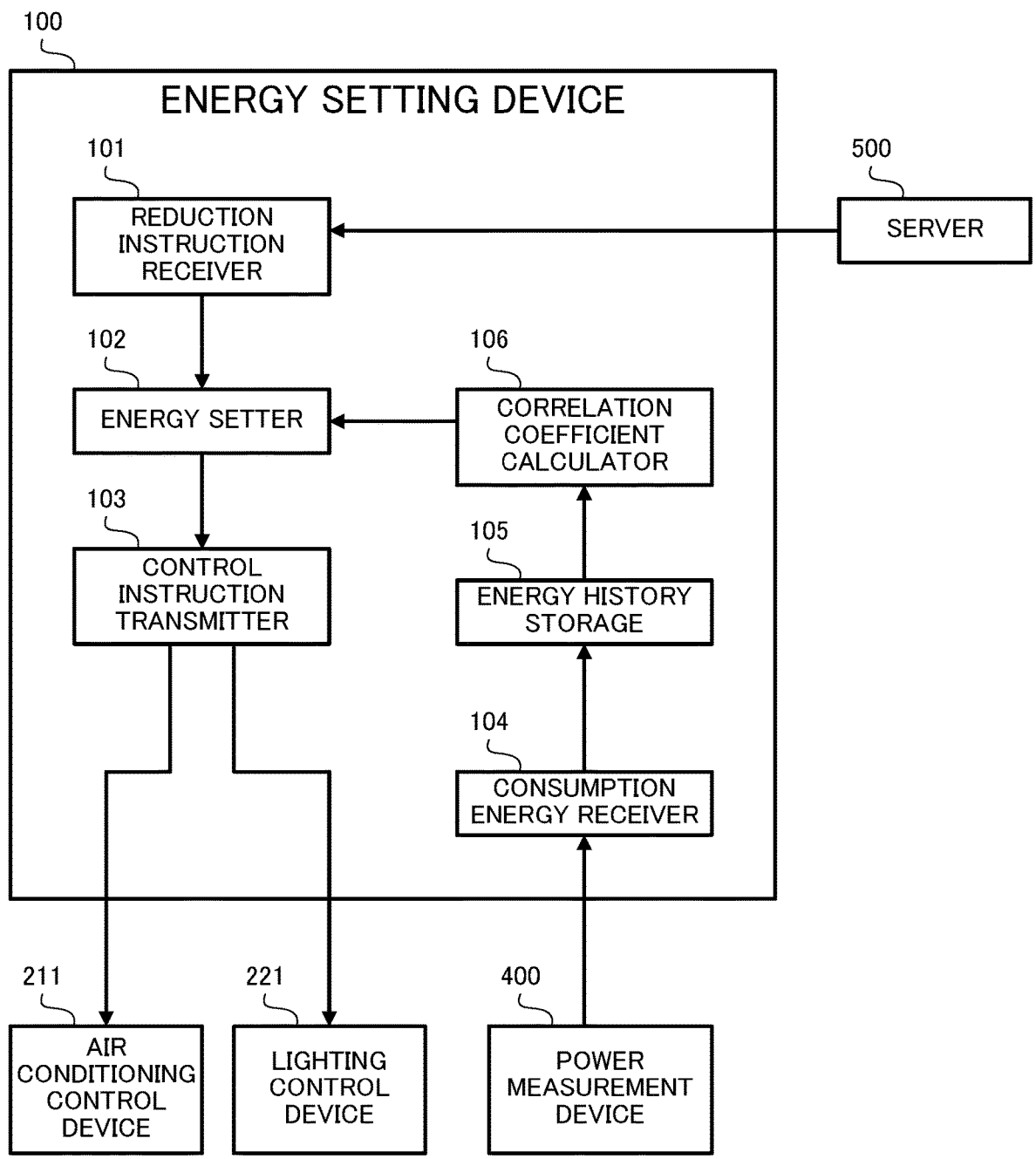
FIG. 3 is a functional system configuration drawing of the energy setting device according to Embodiment 1 of the present disclosure.

Next, functions of the energy setting device 100 are described with reference to FIG. 3. As illustrated in FIG. 3, the energy setting device 100 is functionally equipped with a reduction instruction receiver 101, an energy setter 102, a control instruction transmitter 103, a consumption energy receiver 104, an energy history storage 105, and a correlation coefficient calculator 106. Reduction-instruction receiving means, for example, corresponds to the reduction instruction receiver 101. Energy setting means, for example, corresponds to the energy setter 102. Control-instruction transmitting means, for example, corresponds to the control instruction transmitter 103. Consumption energy receiving means, for example, corresponds to the consumption energy receiver 104. Energy history storage means, for example, corresponds to the energy history storage 105. Correlation coefficient calculation means, for example, corresponds to the correlation coefficient calculator 106.

The reduction instruction receiver 101 receives the reduction instruction for energy with respect to the entirety of the subsystems that are each equipped with the facility device and the control device for controlling the facility device. The air conditioning system 210 and the lighting system 220 are subsystems. The air conditioner 212, the air conditioner 213, the lighting equipment unit 222, and the lighting equipment unit 223 are facility devices. The air conditioning control device 211 and the lighting control device 221 are control devices. The reduction instruction receiver 101, for example, receives the reduction instruction for energy from the server 500. That is to say, the reduction instruction receiver 101 receives the reduction instruction from the server 500. Furthermore, the total target energy is designated by the reduction instruction. The function of the reduction instruction receiver 101, for example, is achieved by functioning of the first communication interface 14 or by functioning of the touch screen 13.

Upon receiving the reduction instruction via the reduction instruction receiver 101, the energy setter 102 sets the individual target energy for each of the subsystems so as to satisfy a first condition and a second condition. The first condition is that a sum of the individual target energies is smaller than the total target energy. The second condition is that a higher correlation among consumption energies of the subsystems provides an increase in the total margin energy. The function of the energy setter 102 is achieved, for example, by functioning of the processor 11.

On the basis of the individual target energy set by the energy setter 102, the control instruction transmitter 103 transmits, to the control device, control-instruction information providing instruction for control of the facility device. That is, via the communication network 620, the control instruction transmitter 103 transmits, to the air conditioning control device 211, the control-instruction information providing instruction for control of the air conditioner 212 and the air conditioner 213 on the basis of the individual target energy set for the air conditioning system 210. Moreover, via the communication network 620, the control instruction transmitter 103 transmits, to the lighting control device 221, the control-instruction information providing instruction for control of the lighting equipment unit 222 and the lighting equipment unit 223 on the basis of the individual target energy set for the lighting system 220. The functions of the control instruction transmitter 103 are achieved, for example, in cooperation between the processor 11 and the second communication interface 15.

Here, the total target energy is designated by the aforementioned reduction instruction. The energy setter 102 sets the individual target energy for each of the subsystems such that a higher correlation coefficient between individual energy histories that are histories of consumption energies for the respective subsystems provides a smaller sum of the individual target energies.

Specifically, the energy setter 102 sets, as the total margin energy, a value obtained by multiplying by a predetermined coefficient by a maximum value from among (i) a sum of individual actual energies for combinations of subsystems among the subsystems for which the correlation coefficient of their individual energy histories is greater than or equal to a predetermined threshold and (ii) the individual actual energies of the respective subsystems. The individual actual energy is, for each of the subsystems, an actual value of the consumption energy. In the present embodiment, although the actual value is an average value, the actual value may be a central value, a maximum value, a mode value, a minimum value, or the like. The energy setter 102 specifies a maximum power consumption source by treating, as a power consumption source, (i) a combination of subsystems that has a correlation coefficient greater than or equal to the threshold and (ii) each of the subsystems. The maximum power consumption source is the power consumption source for which the actual energy is maximum. The actual energy is the individual actual energy or the sum of the individual actual energies. The energy setter 102 sets, as the total margin energy, a value obtained by multiplying a predetermined coefficient by the actual energy occurring in the maximum power consumption source. Also, the energy setter 102 sets the individual target energy from the total target energy and the total margin energy.

Here, for each of the subsystems, the energy setter 102 sets, as the individual target energy, a value obtained by subtracting the individual margin energy from a standard individual target energy. The "standard individual target energy" is a value obtained by multiplying an actual energy fraction by the total target energy. The "actual energy fraction" is a fraction of the individual actual energy relative to a total actual energy that is a sum of the individual actual energies for each of the subsystems.

The consumption energy receiver 104 receives, from the power measurement device 400 measuring the consumption energy for each of the subsystems, consumption energy information indicating the measured consumption energy and the identification information of the system. The function of the consumption energy receiver 104, for example, is achieved by functioning of the second communication interface 15.

The energy history storage 105 generates the energy history information on the basis of the consumption energy information received by the consumption energy receiver 104, and stores the generated energy history information. The energy history information is information indicating, for each of the subsystems, the individual energy history that is a history of the consumption energy occurring in a most recent predetermined period. The function of the energy history storage 105 is achieved, for example, in cooperation between the processor 11 and the flash memory 12.

The energy history information is described with reference to FIG. 4. The energy history information is information that indicates, for each of the subsystems, the consumption energy for each period of a predetermined length occurring within a most recent predetermined period. In FIG. 4, the individual energy history that is the consumption energies of the air conditioning system 210 each 30 minutes occurring in the most recent one-month period is indicated as Wa1, Wa2, . . . Wa1440; and the individual energy history that is the consumption energy of the lighting system 220 each 30 minutes occurring in the most recent one-month period is indicated as Wb1, Wb2, . . . Wb1440.

The correlation coefficient calculator 106 finds the correlation coefficient between individual energy histories on the basis of the energy history information stored in the energy history storage 105. The functions of the correlation coefficient calculator 106 are achieved, for example, by functioning of the processor 11.

A case is envisioned in which (i) a first individual energy history that is time series data of the consumption energy of the air conditioning system 210 and (ii) a second individual energy history that is time series data of the consumption energy of the lighting system 220 each include n elements. In this case, a correlation coefficient r can be expressed, for example, by Formula 1, in which $x_i$ is taken to be an i-th element included in the first individual energy history, $y_i$ is taken to be an i-th element included in the second individual energy history, $m_x$ is taken to be an average value of n elements included in the first individual energy history, and $m_y$ is taken to be an average value of n elements included in the second individual energy history.

[Formula 1]

$$r = \frac{\sum_{i=1}^{n}(x_i - m_x)(y_i - m_y)}{\sqrt{\sum_{i=1}^{n}(x_i - m_x)^2 \times \sum_{i=1}^{n}(y_i - m_y)^2}} \quad (1)$$

Furthermore, in the present embodiment, the subsystems are arranged in accordance with type of the facility device. That is, the air conditioning system 210 is arranged as a subsystem for which the type of the facility device is the air conditioner, and the lighting system 220 is arranged as a subsystem for which the type of the facility device is the lighting equipment unit.

Figure 5:
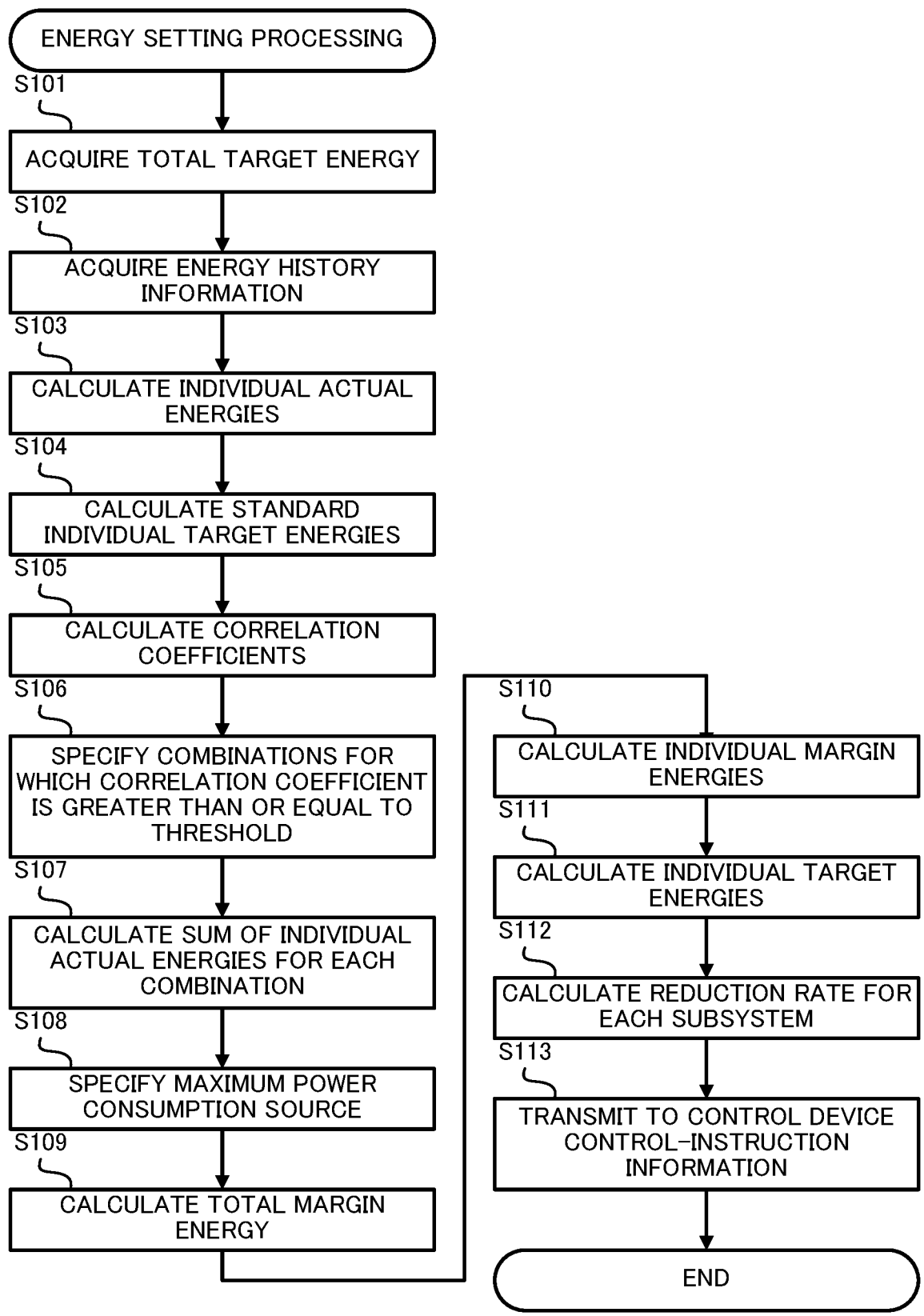
FIG. 5 is a flow chart illustrating energy setting processing executed by the energy setting device according to Embodiment 1 of the present disclosure.

Next, energy setting processing executed by the energy setting device 100 is described with reference to the flow chart of FIG. 5. The energy setting processing, for example, is executed in response to the energy setting device 100 receiving the reduction instruction information from the server 500.

Firstly, the processor 11 acquires the total target energy (step S101). For example, the processor 11 acquires the total target energy designated by the reduction instruction information. Upon completion of the processing of step S101, the processor 11 acquires the energy history information (step S102). For example, the processor 11 acquires the energy history information stored in the flash memory 12. Upon completion of the processing of step S102, the processor 11 calculates the individual actual energies (step S103). For example, the processor 11 finds the individual actual energies on the basis of the energy history information. Upon completion of the processing of step S103, the processor 11 calculates the standard individual target energies (step S104). For example, the processor 11 finds the total actual energy from the individual actual energies, finds the actual energy fractions from the total actual energy and the individual actual energies, and finds the standard individual target energies by multiplying the actual energy fractions by the total target energy.

Upon completion of the processing of step S104, the processor 11 calculates the correlation coefficients (step S105). For example, the processor 11 calculates, on the basis of the energy history information, the correlation coefficients among the individual energy histories for all subsystem pair combinations included in the subsystems. Upon completion of the processing of step S105, the processor 11 specifies the combinations for which the correlation coefficient is greater than or equal to the threshold (step S106). These subsystem pair combinations are combinations of two or more subsystems. An example of this threshold is 0.5.

Upon completion of the processing of step S106, the processor 11 calculates the sum of the individual actual energies for each combination (step S107). Upon completion of the processing of step S107, the processor 11 specifies the maximum power consumption source (step S108). For example, the processor 11 specifies the power consumption source for which the actual energy is largest among (i) the subsystem for which the individual actual energies are maximum and (ii) the combination for which the sum of the individual actual energies is maximum. The actual energy is the sum of the individual actual energies or is an individual actual energy. Upon completion of the processing of step S108, the processor 11 calculates the total margin energy (step S109). For example, the processor 11 sets, as the total margin energy, a value obtained by multiplying a predetermined coefficient by the actual energy occurring at the maximum power consumption source. An example of this coefficient is 0.1.

Upon completion of the processing of step S109, the processor 11 calculates the individual margin energies (step S110). For example, for each subsystem, the processor 11 calculates, as the individual margin energy, a value obtained by multiplying the actual energy fraction by the total margin energy. Upon completion of the processing of step S110, the processor 11 calculates the individual target energies (step S11). For example, the processor 11 calculates, as the individual target energy, a value obtained by subtracting the individual margin energy from the standard individual target energy.

Upon completion of the processing of step S111, the processor 11 calculates a reduction rate for each subsystem (step S112). For example, the processor 11 calculates, as the reduction rate, a value obtained by dividing, by the average consumption energy, a difference between the average consumption energy and the individual target energy. For example, on the basis of the energy history information, the processor 11 can find the average consumption energy. Further, the individual actual energy is preferably taken to be this average consumption energy.

Upon completion of the processing of step S112, the processor 11 transmits to the control device the control-instruction information (step S113). For example, the processor 11 transmits, to the air conditioning control device 211 and the lighting control device 221, the control-instruction information providing instruction for control of the facility device on the basis of the individual target energy. Further, the expression "control of the facility device on the basis of the individual target energy" is basically synonymous with "control of the facility device on the basis of the reduction rate".

For example, in the case in which the air conditioning system 210 performs a cooling operation, the air conditioning system 210 raises the setting temperature by 2 degrees when the reduction rate is 0% to 30%, controls the upper limit of cooling capacity at 50% when the reduction rate is 310% to 50%, executes blowing operation instead of cooling operation when the reduction rate is 51% to 80%, and stops operation when the reduction rate is 81% to 100%. Upon completion of the processing of step S113, the processor 11 completes the energy setting processing.

Hereinafter, a case is described in which the average consumption energy of the air conditioning system 210 is 7 kWh, the average consumption energy of the lighting system 220 is 3 kWh, the total target energy is 8 kWh, and the correlation between the individual energy histories of the air conditioning system 210 and the lighting system 220 (referred to appropriately hereinafter simply as the "correlation coefficient") is 0.7.

In this case, the standard individual target energy of the air conditioning system 210 is 8 kWh×7 kWh/(7 kWh+3 kWh) =5.6 kWh. and the standard individual target energy of the lighting system 220 is 8 kWh×3 kWh/(7 kWh+3 kWh)=2.4 kWh. Also, the combination of the air conditioning system 210 and the lighting system 220 serves as the maximum power consumption source. Further, the average consumption energy of the maximum power consumption source is 5.6 kWh+2.4 kWh=8.0 kWh. Here, taking the coefficient to be 0.1, the total margin energy is 0.8 kWh. Moreover, the individual margin energy of the air conditioning system 210 is 0.8 kWh×7 kWh/(7 kWh+3 kWh)=0.56 kWh. and the individual margin energy of the lighting system 220 is 0.8 kWh×3 kWh/(7 kWh+3 kWh)=0.24 kWh.

Then the reduction amount of the air conditioning system 210 is 7 kWh−(5.6 kWh−0.56 kWh)=1.96 kWh. The reduction rate of the air conditioning system 210 is 1.96 kWh/7 kW=28%. The reduction amount of the lighting system 220 is 3 kWh−(2.4 kWh−0.24 kWh)=0.84 kWh. The reduction rate of the lighting system 220 is 0.84 kWh/3 kW=28%.

Next, a case is described in which the average consumption energy of the air conditioning system 210 is 7 kWh, the average consumption energy of the lighting system 220 is 3 kWh, the total target energy is 8 kWh, and the correlation coefficient for the air conditioning system 210 and the lighting system 220 is 0.2.

In this case, the standard individual target energy of the air conditioning system 210 is 5.6 kWh, and the standard individual target energy of the lighting system 220 is 2.4 kWh. Further, the air conditioning system 210 is the maximum power consumption source. Thus, the average consumption energy of the maximum power consumption source is 5.6 kWh. Here, assuming the coefficient is 0.1, the total margin energy is 0.56 kWh. Moreover, the individual margin energy of the air conditioning system 210 is 0.56 kWh×7 kWh/(7 kWh+3 kWh)=0.392 kWh, and the individual margin energy of the lighting system 220 is 0.56 kWh×3 kWh/(7 kWh+3 kWh)=0.168 kWh.

Further, the reduction amount of the air conditioning system 210 is 7 kWh−(5.6 kWh−0.392 kWh)=1.792 kWh. The reduction rate of the air conditioning system 210 is 1.792 kWh/7 kW=25.6%. The reduction amount of the lighting system 220 is 3 kWh−(2.4 kWh−0.168 kWh)=0.768 kWh. The reduction rate of the lighting system 220 is 0.768 kWh/3 kW=25.6%.

As described above, in the present embodiment, the higher correlation of the power consumption histories between the subsystems, the wider margin of the energy is set. Specifically, in the present embodiment, the total target energy is designated by the reduction instruction, and the individual target energies of the subsystems are set such that a higher correlation coefficient between individual energy histories of the subsystems provides a decrease in the sum of the individual target energies. According to the present embodiment, the energy can thus be appropriately reduced.

Embodiment 2

In Embodiment 1, an example is described in which the subsystems are set in accordance with the type of the facility device. In the present embodiment, an example is described in which the subsystems are arranged in accordance with the installation region of the facility device. This "installation region" is defined to be a building or a floor of the building, for example.

Figure 6:
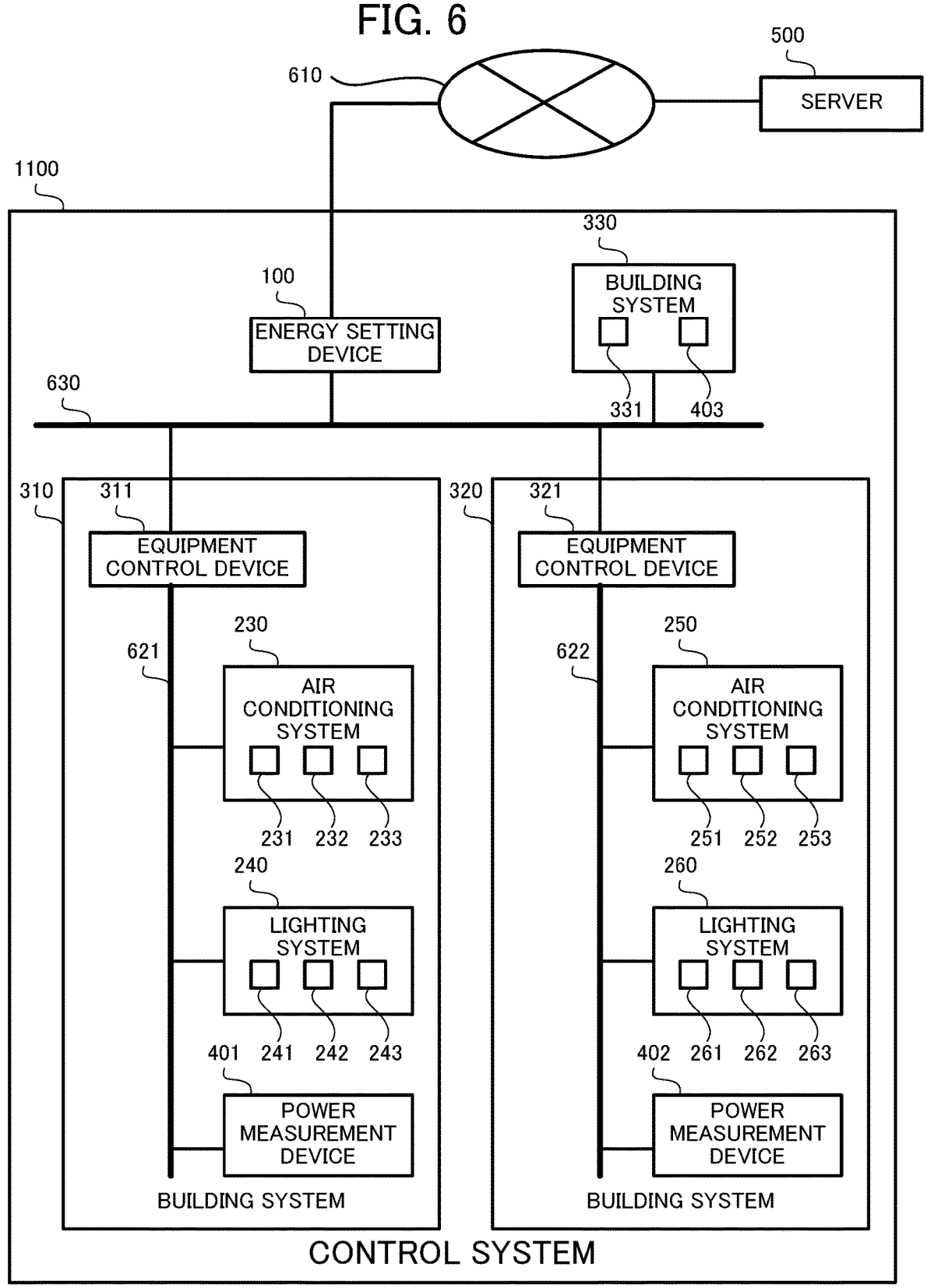
FIG. 6 is a configuration drawing of a control system according to Embodiment 2 of the present disclosure.

Firstly, configuration of a control system 1100 according to Embodiment 2 of the present disclosure is described with reference to FIG. 6. As illustrated in FIG. 6, the control system 1100 is equipped with the energy setting device 100, a building system 310, a building system 320, and a building system 330. The building system 310 is equipped with an equipment control device 311, an air conditioning system 230, a lighting system 240, and a power measurement device 401. The air conditioning system 230 is equipped with an air conditioning control device 231, an air conditioner 232, and an air conditioner 233. The lighting system 240 is equipped with a lighting control device 241, a lighting equipment unit 242, and a lighting equipment unit 243.

The building system 320 is equipped with an equipment control device 321, an air conditioning system 250, a lighting system 260, and a power measurement device 402. The air conditioning system 250 is equipped with an air conditioning control device 251, an air conditioner 252, and an air conditioner 253. The lighting system 260 is equipped with a lighting control device 261, a lighting equipment unit 262, and a lighting equipment unit 263. The building system 330 is equipped with an equipment control device 331, a non-illustrated air conditioning system, a non-illustrated lighting system, and a power measurement device 403.

The energy setting device 100, the equipment control device 311, the equipment control device 321, and the equipment control device 331 are interconnected via a communication network 630. The communication network 630, for example, is a wide area network arranged in a specific area. The equipment control device 311, the air conditioning system 230, the lighting system 240, and the power measurement device 401 are interconnected via a communication network 621. The communication network 621, for example, is a wireless LAN installed within a building. The equipment control device 321, the air conditioning system 250, the lighting system 260, and the power measurement device 402 are interconnected via a communication network 622. The communication network 622, for example, is a wireless LAN installed within a building.

Figure 7:
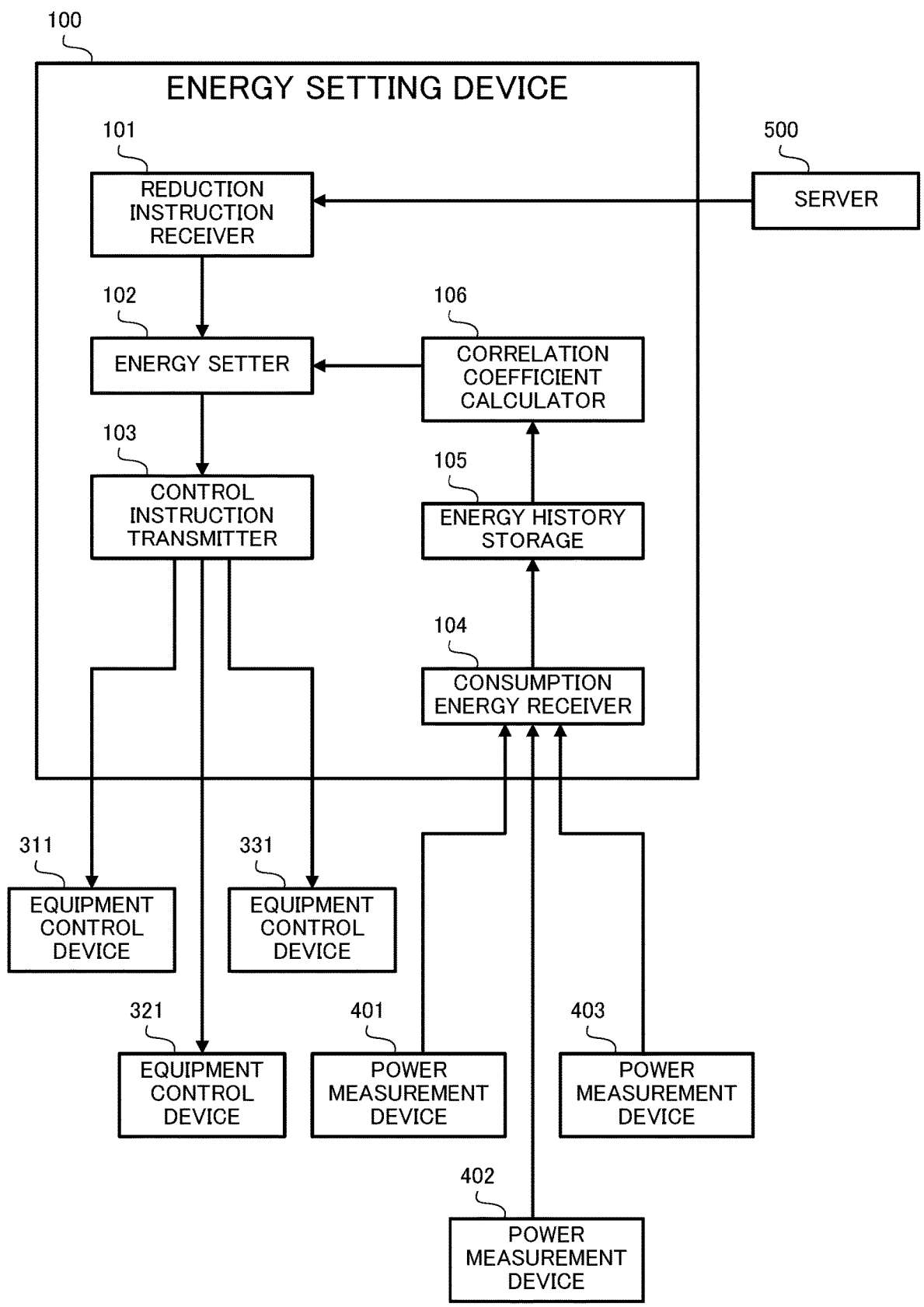
FIG. 7 is a functional system configuration drawing of an energy setting device according to Embodiment 2 of the present disclosure.

In the present embodiment, the building system 310, the building system 320, and the building system 330 are subsystems; and the equipment control device 311, the equipment control device 321, and the equipment control device 331 are control devices. Also in the present embodiment, the total target energy is designated by the reduction instruction. Next, functions of the energy setting device 100 are described with reference to FIG. 7.

The consumption energy receiver 104 receives, from the power measurement device 401, the consumption energy information indicating the identification information of the building 310 and the consumption energy of the building system 310. The consumption energy receiver 104 receives, from the power measurement device 402, the consumption energy information indicating the identification information of the building system 320 and the consumption energy of the building system 320. The consumption energy receiver 104 receives, from the power measurement device 403, the consumption energy information indicating the identification information of the building system 330 and the consumption energy of the building system 330.

The energy setter 102, for each of the subsystems, sets an individual energy indicator value such that a higher correlation coefficient between an individual energy history of the subsystem and an individual energy history of another subsystem provides an increase in the individual energy indicator value. The "individual energy indicator value" is a value expressing an indicator of a magnitude of the consumption energy in a case in which the power consumption source centered on each of the subsystems is envisioned. Moreover, the energy setter 102 sets, as the total margin energy, a value obtained by multiplying a predetermined coefficient by a maximum value among the individual energy indicator values. The energy setter 102 sets the individual target energy from the total target energy and the total margin energy.

Moreover, for each of the subsystems, the energy setter 102 sets, as the individual target energy, a value obtained by subtracting the individual margin energy from a standard individual target energy. The "standard individual target energy" is a value obtained by multiplying the total target energy by an actual energy fraction that is a fraction of the individual actual energy relative to a total actual energy that is a sum of the individual actual energies for each of the subsystems. The "individual margin energy" is a value obtained by multiplying the total margin energy by an indicator value fraction that is a fraction of the individual energy indicator value relative to a total energy indicator value that is a sum of the individual energy indicator values for each of the subsystems.

Here, the individual energy indicator value of a first subsystem among the subsystems is a total of the individual actual energy of the first subsystem and a sum of correction energies in a case in which (i) all of subsystems other than the first subsystem are selected as a second subsystem from among the subsystems and (ii) the correction energies are also found. The correction energy is a product of the individual actual energy of the second subsystem and the correlation coefficient between the consumption energy histories of the first subsystem and the second subsystem.

The control instruction transmitter 103 transmits, to the equipment control device 311 via the communication network 630, the control-instruction information giving an instruction for control of the facility device on the basis of the individual target value set for the building system 310. The control instruction transmitter 103 transmits, to the equipment control device 321 via the communication network 630, the control-instruction information giving an instruction for control of the facility device on the basis of the individual target value set for the building system 320. The control instruction transmitter 103 transmits, to the equipment control device 331 via the communication network 630, the control-instruction information giving an instruction for control of the facility device on the basis of the individual target value set for the building system 330.

Figure 8:
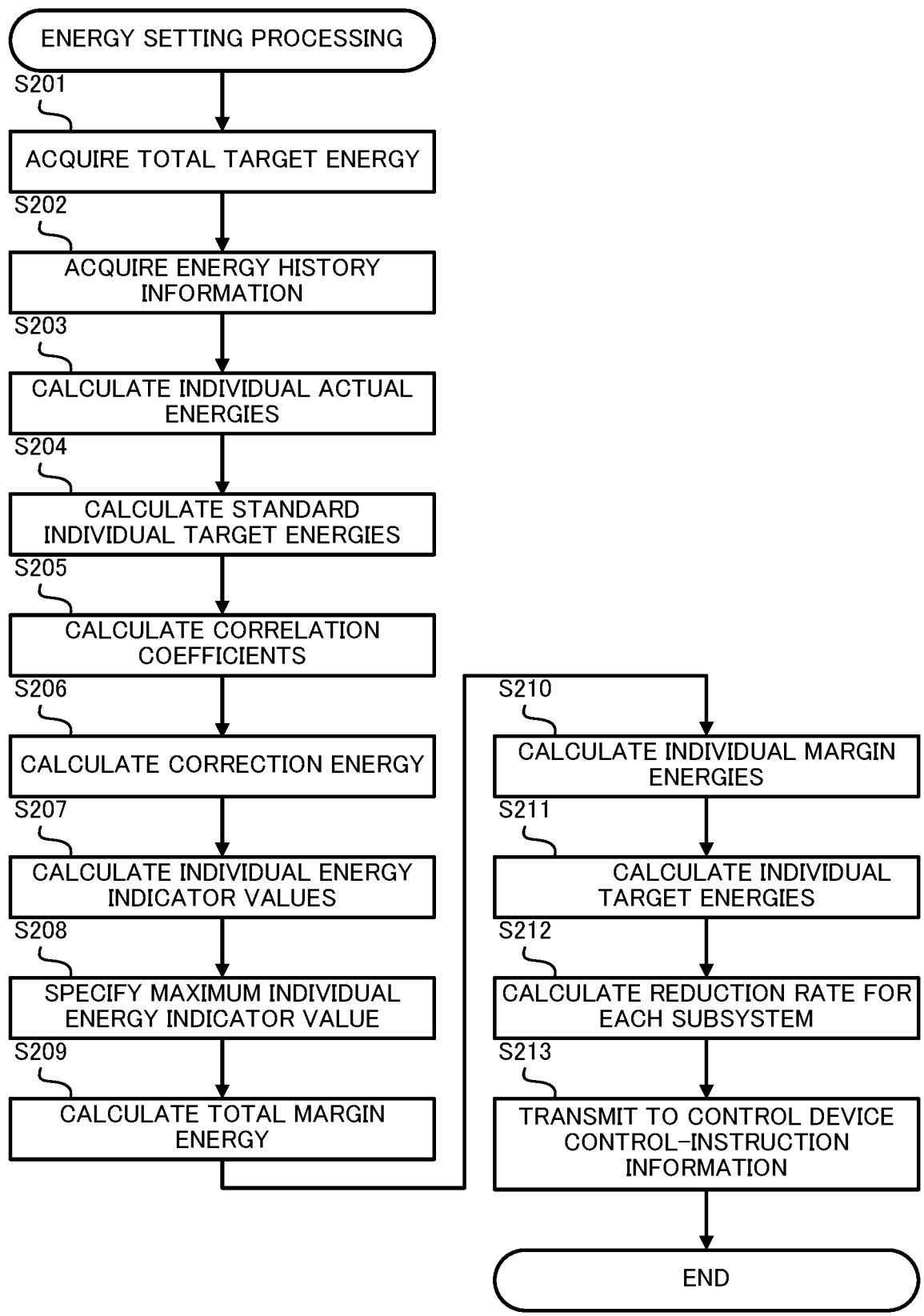
FIG. 8 is a flow chart illustrating energy setting processing executed by the energy setting device according to Embodiment 2 of the present disclosure.

Next, energy setting processing executed by the energy setting device 100 is described with reference to the flow chart of FIG. 8. The processing from step S201 to step S205 is similar to the processing from step S101 to step S105, and thus further description of such processing is omitted.

Upon completion of the processing of step S205, the processor 11 calculates the correction energy (step S206). For example, the processor 11 calculates the correction energy for each subsystem on the basis of the individual actual energy and the correlation coefficient. Upon completion of the processing of step S206, the processor 11 calculates the individual energy indicator values (step S207). For example, for the first subsystem, the processor 11 calculates the individual energy indicator values on the basis of the sum of the correction energies and the individual actual energy of the first subsystem. Upon completion of the processing of step S207, the processor 11 specifies the maximum individual energy indicator value (step S208).

Upon completion of the processing of step S208, the processor 11 calculates the total margin energy (step S209). For example, the processor 11 calculates the total margin energy on the basis of the maximum individual energy indicator value and a predetermined coefficient. Upon completion of the processing of step S209, the processor 11 calculates the individual margin energies (step S210). For example, the processor 11 calculates the individual margin energies on the basis of the total margin energy and an indicator value fraction that is a fraction of the individual energy indicator value relative to the total energy indicator value. Hereinafter, the processing from step S211 to step S213 is similar to the processing from step S111 to step S113, and thus further description is omitted.

A case is described below in which the average consumption energy of the building system 310 is 7 kWh, the average consumption energy of the building system 320 is 3 kWh, the average consumption energy of the building system 330 is 2 kWh, the total target energy is 8 kWh, the correlation coefficient between the building system 310 and the building system 320 is 0.7, the correlation coefficient between the building system 310 and the building system 330 is 0.0, and the correlation coefficient between the building system 320 and the building system 330 is 0.0. In the calculations below, approximate values are used as appropriate.

In this case, the standard individual target energy of the building system 310 is 8 kWh×7 kWh/(7 kWh+3 kWh+2 kWh)=4.7 kWh, the standard individual target energy of the building system 320 is 8 kWh×3 kWh/(7 kWh+3 kWh+2 kWh)=2.0 kWh, and the standard individual target energy of the building system 330 is 8 kWh×2 kWh/(7 kWh+3 kWh+2 kWh)=1.3 kWh. The individual energy indicator value of the building system 310 is 4.7 kWh+0.7×2.0 kWh+0.0×1.3 kWh=6.10 kWh. The individual energy indicator value of the building system 320 is 2.0 kWh+0.7×4.7 kWh+0.0×1.3 kWh=5.29 kWh. The individual energy indicator value of the building system 330 is 1.3 kWh+0.0×2.0 kWh+0.0×4.7 kWh=1.30 kWh.

The maximum individual energy indicator value is 6.10 kWh. Here, when the coefficient is taken to be 0.1, the total margin energy is 0.61 kWh. The individual margin energy of the building system 310 is 0.61 kWh×6.1 kWh/(6.1 kWh+5.29 kWh+1.3 kWh)=0.29 kWh, the individual margin energy of the building system 320 is 0.61 kWh×5.29 kWh/(6.1 kWh+5.29 kWh+1.3 kWh)=0.26 kWh, and the individual margin energy of the building system 330 is 0.61 kWh×1.3 kWh/(6.1 kWh+5.29 kWh+1.3 kWh)=0.06 kWh. The reduction rate of the building system 310 is (7 kWh−(4.7 kWh−0.29 kWh))/7 kWh=37.0%. The reduction rate of the building system 320 is (3 kWh−(2.0 kWh−0.26 kWh))/3 kWh=42.0%. The reduction rate of the building system 330 is (2 kWh−(1.3 kWh−0.06 kWh))/2 kWh=38.0%.

A case is described next in which the average consumption energy of the building system 310 is 7 kWh, the average consumption energy of the building system 320 is 3 kWh, the average consumption energy of the building system 330 is 2 kWh, the total target energy is 8 kWh, the correlation coefficient between the building system 310 and the building system 320 is 0.2, the correlation coefficient between the building system 310 and the building system 330 is 0.0, and the correlation coefficient between the building system 320 and the building system 330 is 0.0.

In this case, the standard individual target energy of the building system 310 is 4.7 kWh, the standard individual target energy of the building system 320 is 2.0 kWh. and the standard individual target energy of the building system 330 is 1.3 kWh. The individual energy indicator value of the building system 310 is 4.7 kWh+0.2×2.0 kWh+0.0×1.3 kWh=5.10 kWh. The individual energy indicator value of the building system 320 is 2.0 kWh+0.2×4.7 kWh+0.0×1.3 kWh=2.94 kWh. The individual energy indicator value of the building system 330 is 1.3 kWh+0.0×2.0 kWh+0.0×4.7 kWh=1.30 kWh.

The maximum individual energy indicator value is 5.10 kWh. Here, when the coefficient is taken to be 0.1, the total margin energy is 0.51 kWh. The individual margin energy of the building system 310 is 0.51 kWh×5.10 kWh/(5.10 kWh+2.94 kWh+1.30 kWh)=0.28 kWh, the individual margin energy of the building system 320 is 0.51 kWh×2.94 kWh/(5.10 kWh+2.94 kWh+1.30 kWh)=0.16 kWh, and the individual margin energy of the building system 330 is 0.51 kWh×1.30 kWh/(5.10 kWh+2.94 kWh+1.30 kWh)=0.07 kWh. The reduction rate of the building system 310 is (7 kWh−(4.7 kWh−0.28 kWh))/7 kWh=36.8%. The reduction rate of the building system 320 is (3 kWh−(2.0 kWh−0.16 kWh))/3 kWh=38.6%. The reduction rate of the building system 330 is (2 kWh−(1.3 kWh−0.07 kWh))/2 kWh=38.5%.

In the present embodiment, processing is performed continuously without cutoff of the correlation coefficient according to threshold. Thus, the present embodiment is anticipated to appropriately reduce the energy.

Embodiment 3

In the present embodiment, an example is described in which the concept of an overall correlation coefficient is used to set various types of energy.

The energy setter 102 finds an overall correlation coefficient that is the correlation coefficient for an entirety of subsystems on the basis of (i) the correlation coefficients between the individual energy histories of the subsystems and (ii) the actual energy fraction occurring in each of the subsystems. The actual energy faction is the fraction of the individual actual energy relative to the total actual energy that is the sum of the individual actual energies that are actual values of the consumption energy for each of the subsystems. The energy setter 102 sets, as the total margin energy, a product of the overall correlation coefficient, the total target energy, and a predetermined coefficient. The energy setter 102 sets, from the total target energy and the total margin energy, the individual target energy for each of the subsystems.

The overall correlation coefficient is a sum of products found by multiplication of the actual energy fraction of the first subsystem by an average value of the correlation coefficients between individual energy histories of the first subsystem and each of subsystems, up until all the subsystems are selected as the first subsystem.

Figure 9:
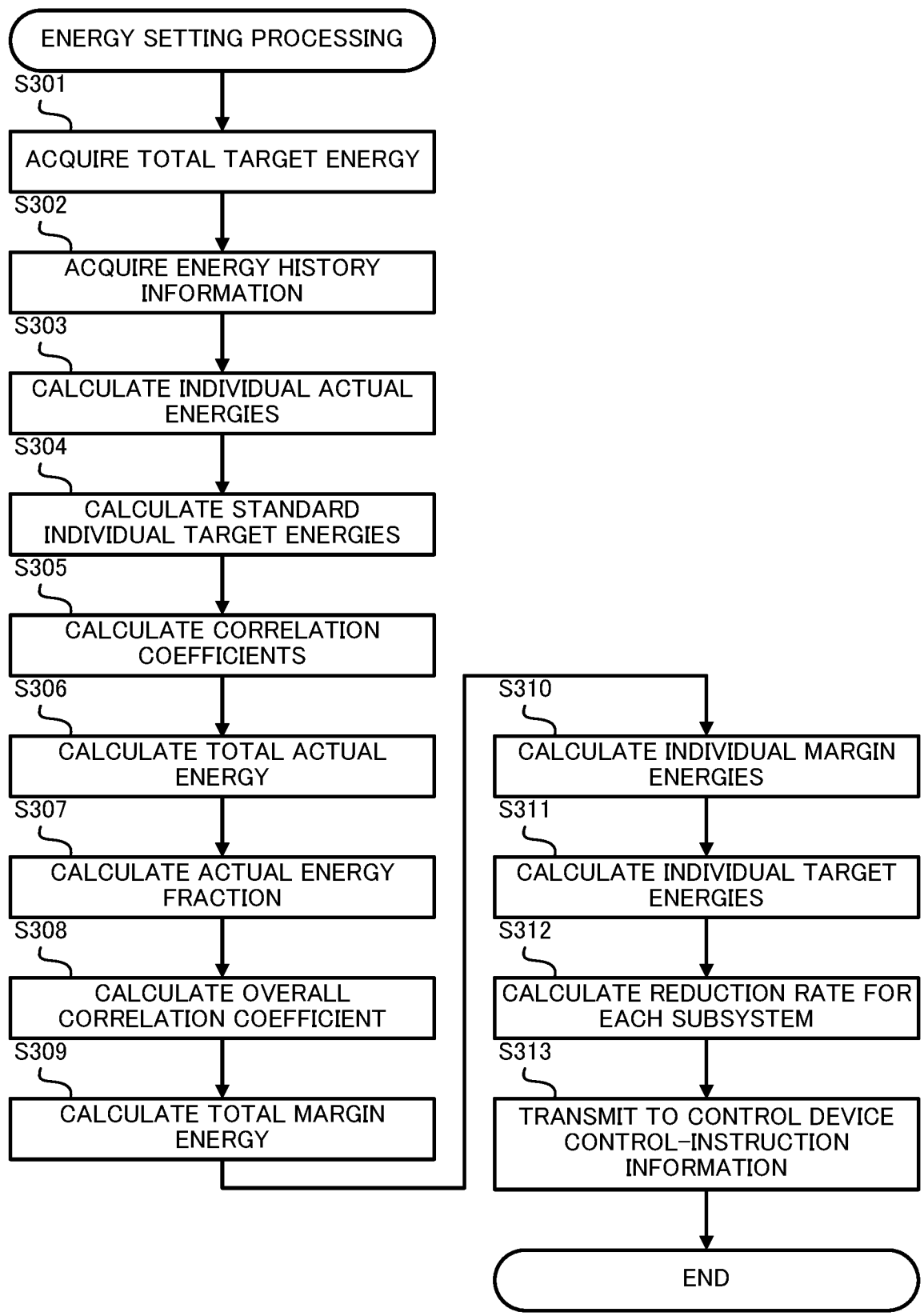
FIG. 9 is a flow chart illustrating energy setting processing executed by an energy setting device according to Embodiment 3 of the present disclosure.

Next, the energy setting processing executed by the energy setting device 100 is described with reference to the flowchart of FIG. 9. Further, the processing from step S301 to step S305 is similar to the processing from step S201 to step S205, and thus further description of such processing is omitted.

Upon completion of the processing of step S305, the processor 11 calculates the total actual energy (step S306). Upon completion of the processing of step S306, the processor 11 calculates the actual energy fraction (step S307). Upon completion of the processing of step S307, the processor 11 calculates the overall correlation coefficient (step S308). Upon completion of the processing of step S308, the processor 11 calculates the total margin energy (step S309). Upon the completion of step S309, the processor 11 calculates the individual margin energies (step S310). Further, the processing from step S311 to step S313 is similar to the processing from step S211 to step S213, and thus further description of such processing is omitted.

The overall correlation coefficient is defined, for example, as (the correlation coefficient between the building system 310 and the building system 310× the power consumption rate of the building system 310+ the correlation coefficient between the building system 310 and the building system 320× the power consumption rate of the building system 310+ the correlation coefficient between the building system 310 and the building system 330× the power consumption rate of the building system 310+ the correlation coefficient between the building system 320 and the building system 310× the power consumption rate of the building system 320+ the correlation coefficient between the building system 320 and the building system 320× the power consumption rate of the building system 320+ the correlation coefficient between the building system 320 and the building system 330× the power consumption rate of the building system 320+ the correlation coefficient between the building system 330 and the building system 310× the power consumption rate of the building system 330+ the correlation coefficient between the building system 330 and the building system 320× the power consumption rate of the building system 330+ the correlation coefficient between the building system 330 and the building system 330× the power consumption rate of the building system 330) the number of subsystems.

In the present embodiment, the various types of energy are set on the basis of the overall correlation coefficient. Specifically, the individual target energies are set such that a higher overall correlation coefficient provides an increase in the total margin energy and an increase in the individual margin energy. The present embodiment thus can be anticipated to appropriately reduce consumption of the energies.

Embodiment 4

In Embodiment 1, an example is described in which the total target energy is designated by the reduction instruction. In the present embodiment, an example is described in which the total target energy is not designated by the reduction instruction. That is, in the present embodiment, an example is described in which the total margin energy is set in accordance with correlation coefficients between subsystems and the total target energy is set on the basis of this total margin energy.

Figure 10:
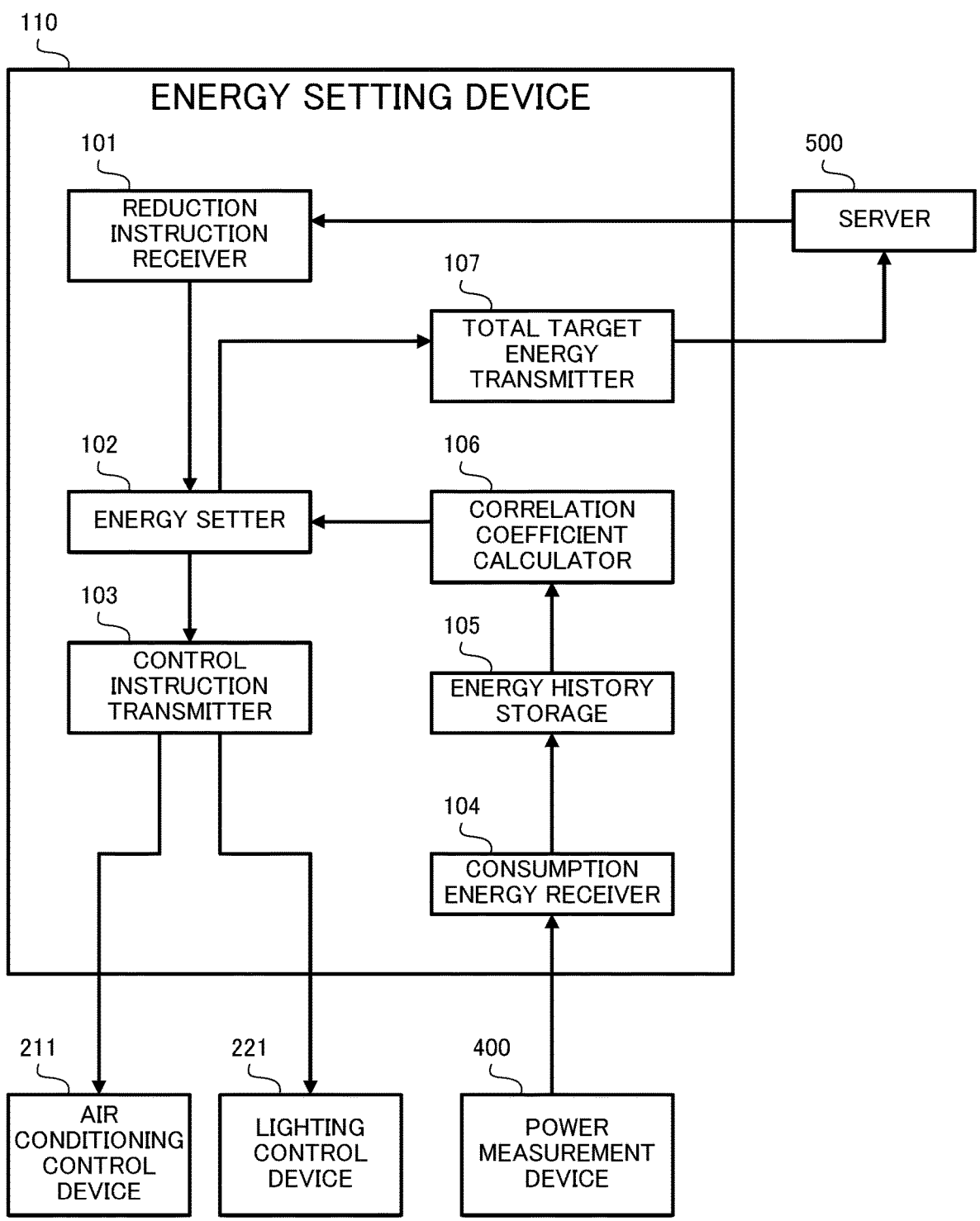
FIG. 10 is a functional system configuration drawing of an energy setting device according to Embodiment 4 of the present disclosure.

Firstly, functions of an energy setting device 110 are described with reference to FIG. 10. The energy setting device 110 is further equipped with a total target energy transmitter 107. Total target energy transmission means corresponds, for example, to the total target energy transmitter 107.

The reduction instruction receiver 101 receives, from the server 500, the reduction instruction information indicating the reduction instruction. The total target energy is not designated by this reduction instruction. The energy setter 102 sets the total target energy such that a higher correlation coefficient between the individual energy histories that are histories of the consumption energy for each of the subsystems provides an increase in the total margin energy.

The total target energy transmitter 107 transmits, to the server 500, the total target energy information indicating the total target energy set by the energy setter 102. The functions of the total target energy transmitter 107 are achieved, for example, by cooperation between the processor 11 and the first communication interface 14.

For each of the subsystems, the energy setter 102 sets, as the individual target energy, a first individual estimate energy that is an estimated energy occurring during execution of predetermined electricity-saving control. The energy setter 102 selects, from among the subsystems, a combination of subsystems of which the correlation coefficient between individual energy performances is greater than or equal to a predetermined threshold, and sets, as the total margin energy, a value obtained by multiplying a predetermined coefficient by a maximum value among (i) a sum of the individual target energies set for in the selected combinations and (ii) the individual target energies for each of the subsystems. The energy setter 102 sets, as the total target energy, a value obtained by adding the total margin energy to the sum of the individual target energies occurring for each of the subsystems.

Figure 11:
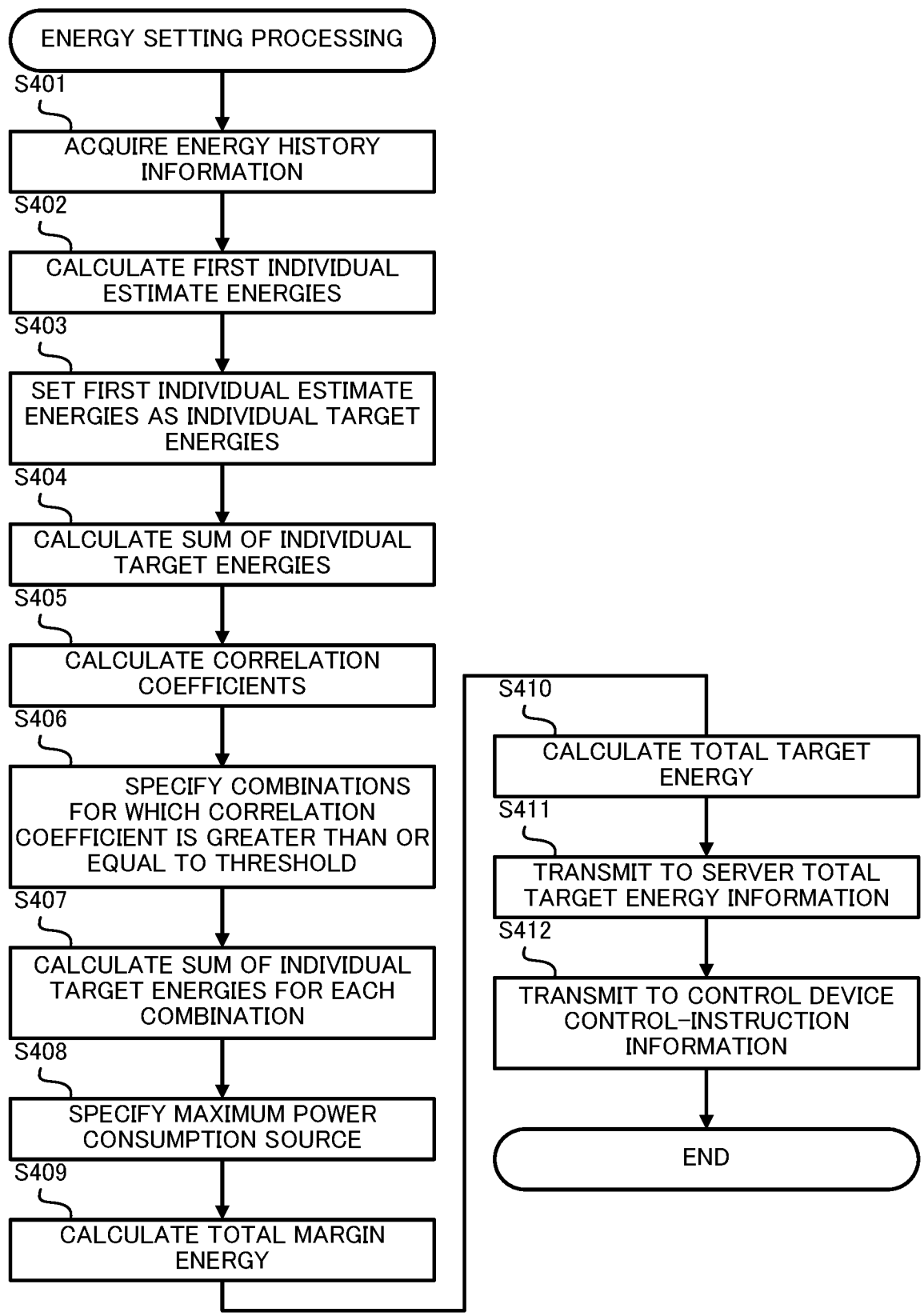
FIG. 11 is a flow chart illustrating energy setting processing executed by the energy setting device according to Embodiment 4 of the present disclosure.

Next, energy setting processing executed by the energy setting device 110 is described with reference to the flow chart of FIG. 11.

Firstly, the processor 11 acquires the energy history information (step S401). Upon completion of the processing of step S401, the processor 11 calculates the first individual estimate energies (step S402). Upon completion of step S402, the processor 11 sets, as the individual target energies, the first individual estimate energies (step S403). Upon completion of the processing of step S403, the processor 11 calculates the sum of the individual target energies for each of the subsystems (step S404). Upon completion of the processing of step S404, the processor 11 calculates the correlation coefficients (step S405). Upon completion of the processing of step S405, the processor 11 specifies a combination of subsystems of which the correlation coefficient is greater than or equal to a threshold (step S406).

Upon completion of the processing of step S406, the processor 11 calculates the sum of the individual target energies for each combination (step S407). Upon completion of the processing of step S407, the processor 11 specifies the maximum power consumption source (step S408). The maximum power consumption source is the power consumption source for which a target energy is highest among (i) the combination for which the sum of the individual target energies is maximum and (ii) the subsystem for which the individual target energy is maximum. This "target energy" is the sum of the individual target energies or is the individual target energy. Upon completion of the processing of step S408, the processor 11 calculates the total margin energy (step S409). The total margin energy is the target energy of the maximum power consumption source.

Upon completion of the processing of step S409, the processor 11 calculates the total target energy (step S410). The total target energy is the sum of the individual target energies calculated in step S404 and the total margin energy calculated in step S409. Upon completion of the processing of step S410, the processor 11 transmits the total target energy information to the server 500 (step S411). Upon completion of the processing of step S411, the processor 11 transmits the control-instruction information to the control device (step S412). This control-instruction information is information giving an instruction for control of the facility device on the basis of the individual target energy that is the first individual estimate energy. That is, the control-instruction information is information giving an instruction for control of the facility device in accordance with the aforementioned electricity-saving control.

In the present embodiment, the total margin energy is set in accordance with the correlation coefficients between the subsystems, and the total target energy is set on the basis of this total margin energy. A suitable reduction of the energy thus can be anticipated according to the present embodiment.

Embodiment 5

In Embodiment 4, an example is described of sending notification of the total target energy to the server 500, in a case in which the total target energy is not designated by the reduction instruction. In the present embodiment, an example is described in which notification of a total target reduction energy is send to the server 500 in a case in which the total target energy is not designated by the reduction instruction. That is, in the present embodiment, an example is described in which the total margin energy is set in accordance with the correlation coefficients between the subsystems, and the total target energy and the total target reduction energy are set on the basis of this total margin energy.

Figure 12:
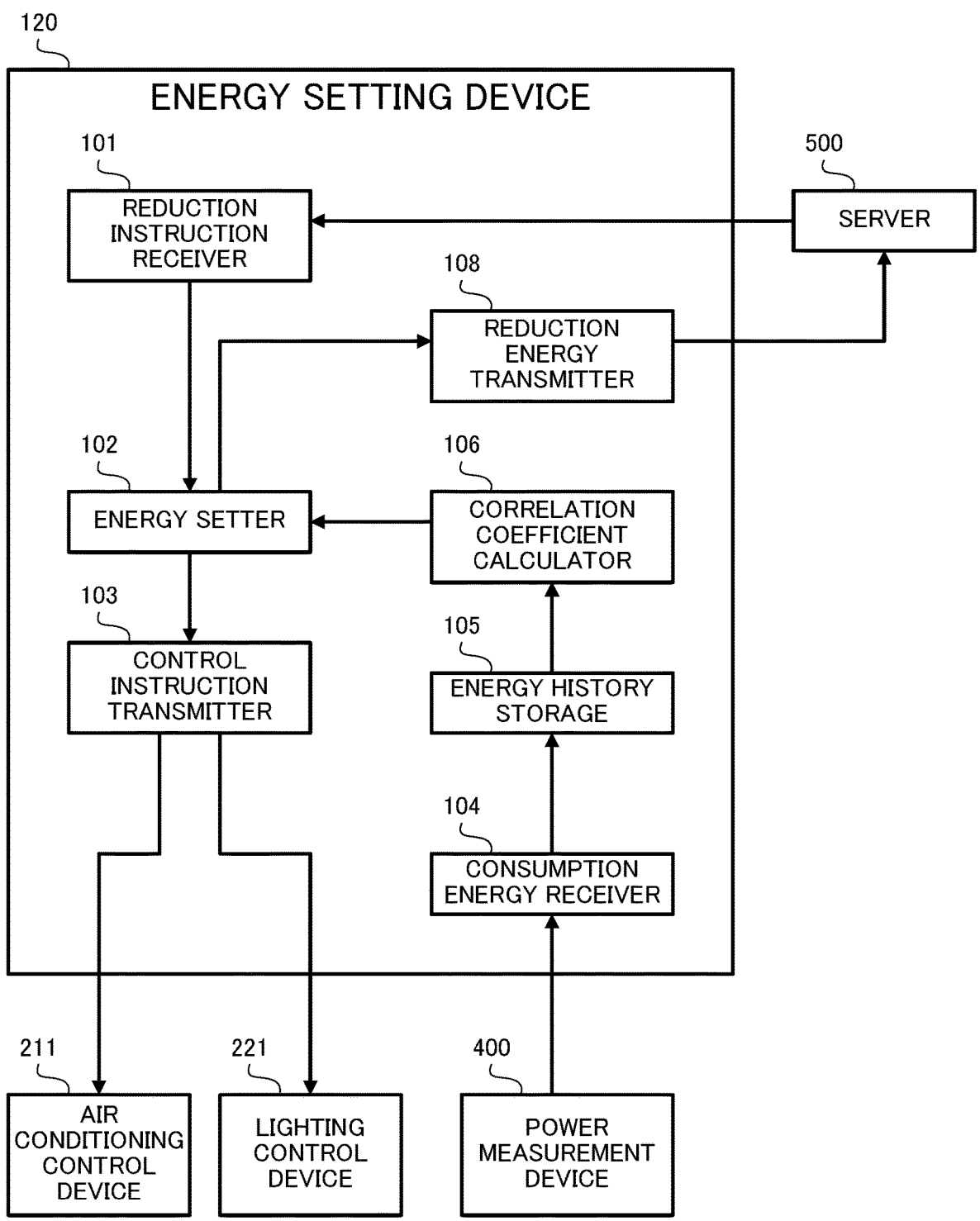
FIG. 12 is a functional system configuration drawing of an energy setting device according to Embodiment 5 of the present disclosure.

Firstly, functions of an energy setting device 120 are described with reference to FIG. 12. The energy setting device 120 is further equipped with a reduction energy transmitter 108. Reduction energy transmission means, for example, corresponds to the reduction energy transmitter 108.

The reduction instruction receiver 101 receives, from the server 500, the reduction instruction information indicating the reduction instruction. The total target energy and the total target reduction energy are not designated by this reduction instruction. The energy setter 102 sets the total target reduction energy such that a higher correlation coefficient between individual energy histories that are histories of consumption energies for each of the subsystems provides a decrease in the total target reduction energy. The total target reduction energy is the target value of the reduction amount of the consumption energy of the entirety of subsystems.

The reduction energy transmitter 108 transmits, to the server 500, the reduction energy information indicating the total target reduction energy set by the energy setter 102. The functions of the reduction energy transmitter 108 are achieved, for example, in cooperation between the processor 11 and the first communication interface 14.

For each of the subsystems, the energy setter 102(i) sets, as the individual target energies, the first individual estimate energies that are estimated energies in the case in which predetermined electricity-saving control is executed, and (ii) sets, as the individual estimate reduction energies, values obtained by subtracting the first individual estimate energy from a second individual estimate energy that is an estimated energy in the case in which electricity-saving control is not performed. The energy setter 102 selects, from the subsystems, a combination of subsystems of which the correlation coefficient between the individual energy performances is greater than or equal to a predetermined threshold, and sets, as the total margin energy, a value obtained by multiplying a predetermined coefficient by a maximum value from among (i) the sum of the individual estimate reduction energies set for the selected combinations and (ii) the individual estimate reduction energies for each of the subsystems. The energy setter 102 sets, as the total target reduction energy, a value obtained by subtracting the total margin energy from the sum of the individual estimate reduction energies set for each of the subsystems.

Figure 13:
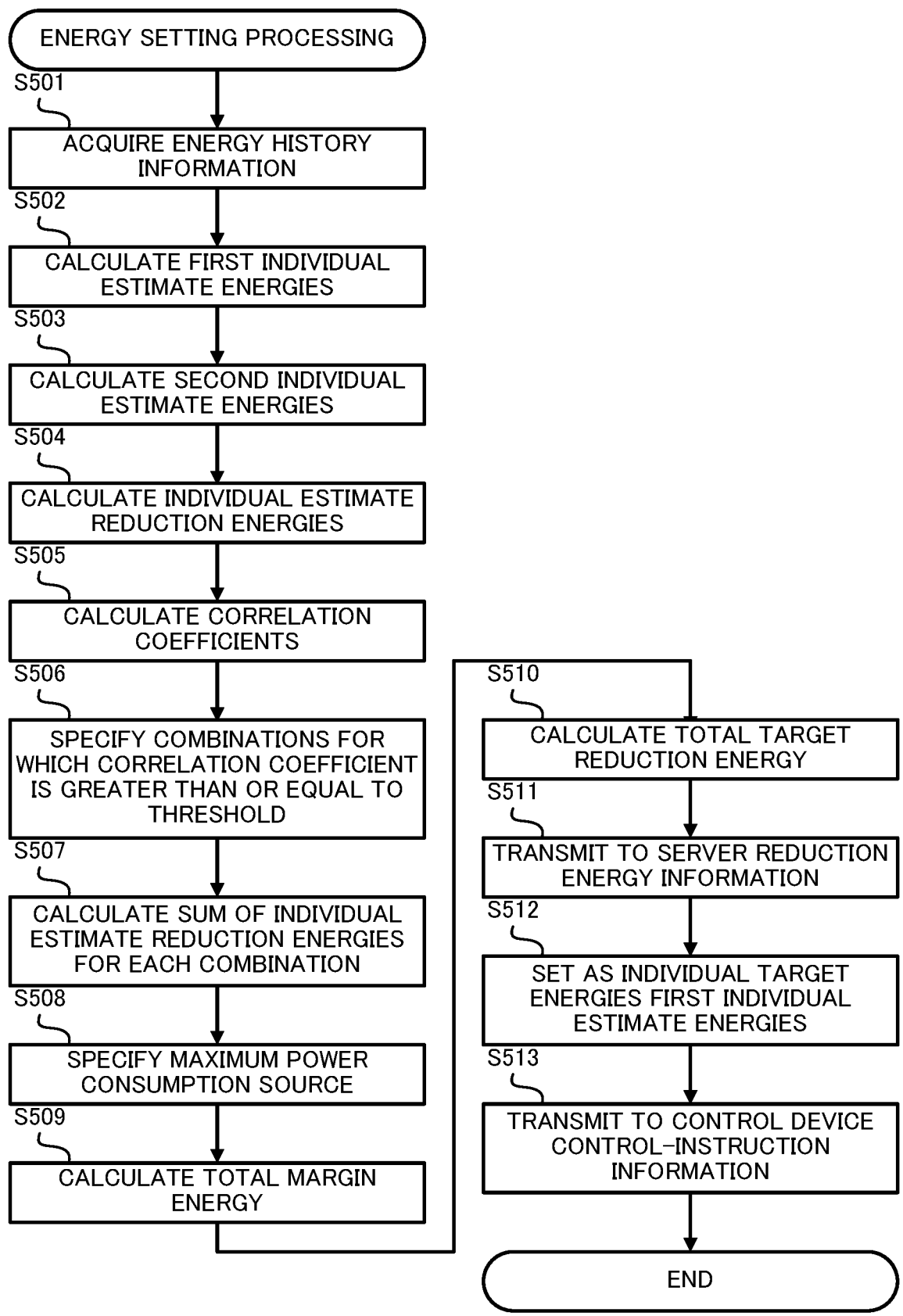
FIG. 13 is a flow chart illustrating energy setting processing executed by an energy setting device according to Embodiment 5 of the present disclosure.

Next, the energy setting processing executed by the energy setting device 120 is described with reference to the flow chart of FIG. 13.

Firstly, the processor 11 acquires the energy history information (step S501). Upon completion of the processing of step S501, the processor 11 calculates the first individual estimate energies (step S502). Upon completion of the processing of step S502, the processor 11 calculates the second individual estimate energies (step S503). Upon completion of the processing of step S503, the processor 11 calculates the individual estimate reduction energy (step S504).

The "first individual estimate energy" is the estimated energy in the case in which predetermined electricity-saving control is executed for each subsystem. The first individual estimate energy is estimated, for example, on the basis of the consumption energy that occurs during electricity-saving control that is performed in the past and in a similar environment such as an exterior air temperature, date, or weekday. The second individual estimate energy is the estimated energy that occurs in the case in which the predetermined electricity-saving control is not executed for each subsystem. The second individual estimate energy is estimated, for example, on the basis of the consumption energy occurring during normal control that is performed in the past and in a similar environment such as the exterior temperature, date, or weekday. The individual estimate reduction energy is the difference between the second individual estimate energy and the first individual estimate energy. Upon completion of the processing of step S504, the processor 11 calculates the correlation coefficients (step S505). Upon completion of the processing of step S505, the processor 11 specifies the combination of subsystems of which the correlation coefficient is greater than or equal to a threshold (step S506).

Upon completion of the processing of step S506, the processor 11 calculates the sum of the individual estimate reduction energies for each of the combinations (step S507). Upon completion of the processing of step S507, the processor 11 specifies the maximum power consumption source (step S508). Upon completion of the processing of step S508, the processor 11 calculates the total margin energy (step S509). Upon completion of the processing of step S509, the processor 11 calculates the total target reduction energy (step S510). Upon completion of the processing of step S510, the processor 11 transmits, to the server 500, the reduction energy information (step S511). Upon completion of the processing of step S511, the processor 11 sets, as the individual target energies, the first individual estimate energies (step S512). Upon completion of the processing of step S512, the processor 11 transmits the control-instruction information to the control device (step S513).

In the present embodiment, the total margin energy is set in accordance with the correlation coefficients between the subsystems, and the total target energy and the total target reduction energy are set on the basis of this total margin energy. Specifically, the total target reduction energy is set so that a higher correlation coefficient between individual energy histories for each of the subsystems provides a decrease in the total target reduction energy, and the resultant total target reduction energy is sent as notification to the server 500. That is, in the case in which the consumption energy cannot be reduced more than anticipated for a certain subsystem, the estimated reduction amount is estimated to be a small amount, with increase in the probability that another subsystem does not compensate for the reduction, and the estimated reduction amount is sent as notification to the server 500. Therefore, according to the present embodiment, the energy can be anticipated to be appropriately reduced.

Modified Example

Although embodiments of the present disclosure are described above, modifications and applications are possible by making various types of changes in execution of the present disclosure.

In the present description, free selection may be made with respect to which parts of the configurations, functions, and operations described in the aforementioned embodiments are adopted. Moreover, in the present disclosure, further configurations, functions, and operations may be used in addition to the aforementioned configurations, functions, and operations. Further, the configurations, functions, and operations described in the aforementioned embodiments can be freely combined.

In Embodiments 1-3, examples are described in which the total target energy is designated by the reduction instruction. Moreover, in Embodiment 4, an example is described of responding with the total target energy. In Embodiment 5, and example is described of responding with the total target reduction energy. In the present disclosure, free selection may be made as to whether the total target energy is designated or the total target reduction energy is designated by the reduction instruction. Moreover, in the case in which the total target energy or the total target reduction energy is not designated by the reduction instruction, free selection is made as to with which of the total target energy or the total target reduction energy the reply is made. For example, the total target reduction energy may be designated by the reduction instruction.

In any of the cases, it is preferable that, the higher the correlation between consumption energies of each of the subsystems, the larger total margin energy is set. Setting of the large total margin energy" means either (i) setting of the sum of the individual target energies that is smaller than the predetermined total target energy, or (ii) setting the total target energy larger than the sum of the predetermined individual target energies. In a similar manner, it is preferable that the higher the correlation between the consumption energies for each of the subsystems, the smaller total target reduction energy is set. Here, setting of the small total target reduction energy means either (i) setting the sum of the individual target reduction energy that is larger than the predetermined total target reduction energy, or (ii) setting the total target reduction energy smaller than the sum of the predetermined individual target reduction energies. Due to such configuration, the risk of an inability to respond to the reduction instruction is anticipated to decrease while the lowering of comfort or convenience of the user is suppressed.

The configurations of the systems used by the energy setting devices 100, 110, and 120 are, of course, not limited to the configurations described in Embodiments 1-5. For example, in Embodiment 1, the power measurement device 400 may be installed for each of the air conditioning system 210 and the lighting system 220. Moreover, in Embodiment 2, the power measurement devices 401, 402, and 403 may be combined into a single power measurement device. Moreover, in Embodiment 2, the energy setting device 100, the building system 310, the building system 320, and the building system 330 may be interconnected via the communication network 610.

Of course, the method for finding the individual target energies from the total target energy is not limited to the configurations described in Embodiments 1-5. For example, the method of distributing to the subsystems the total margin energy is not limited to a method that is in accordance with the actual energy fraction. Moreover, the coefficients used in the various types of calculation may be appropriately adjusted. Further, the consumption energy occurring in the case of execution of electricity-saving control or the consumption energy occurring in the case of normal control may be estimated without being based on the energy history information. For example, such consumption energies may be estimated from a calculation formula prescribed by the power company or the aggregator. This calculation formula, for example, is a formula using as parameters the system configuration and structure information. The system configuration, for example, is set by the number of facility devices and the power ratings of the facility devices. The structure information, for example, is information indicating (i) thermal insulation performance of walls of the floor at which the subsystem is constructed, (ii) surface area of the floor, and (iii) the number of office automation (OA) equipment units.

By use of an operating program prescribing the operation of the energy setting device 100 according to the present disclosure for an existing personal computer or an information terminal device, the personal computer or the like can be also made to function as the energy setting device 100 according to the present disclosure. Moreover, the method of distribution of such a program is freely selected, and for example, distribution is possible by storage on a computer-readable recording medium such as a compact disk read-only memory (CD-ROM), a digital versatile disk (DVD), a memory card, or the like, and the distribution may be performed via a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be used for a control system equipped with subsystems.

REFERENCE SIGNS LIST

11 Processor
12 Flash memory
13 Touch screen
14 First communication interface
15 Second communication interface
100, 110, 120 Energy setting device
101 Reduction instruction receiver
102 Energy setter
103 Control instruction transmitter
104 Consumption energy receiver
105 Energy history storage
106 Correlation coefficient calculator
107 Total target energy transmitter
108 Reduction energy transmitter
210, 230, 250 Air conditioning system
220, 240, 260 Lighting system
310, 320, 330 Building system
311, 321, 331 Equipment control device
400, 401, 402, 403 Power measurement device
500 Server
610, 620, 621, 622, 630 Communication network
1000, 1100 Control system

The invention claimed is:

1. An energy setting device comprising:
a first communication interface configured to receive a reduction instruction for reduction in electrical energy of an entirety of subsystems, each subsystem comprising a facility device and a controller configured to control the facility device;

a processor configured to, when the first communication interface receives the reduction instruction:
  determine a correlation coefficient between individual energy histories that are histories of consumption energies for the respective subsystems,
  calculate a total margin energy, the total margin energy being a difference between a total target energy and the sum of the individual target energies,
    wherein the individual target energies are each a target value of a consumption energy for a corresponding subsystem of the subsystems,
    wherein the total target energy is a target value of a consumption energy of the entirety of the subsystems, and
    wherein the calculated total margin energy is determined based upon the correlation coefficient, with the total margin energy increasing with an increase in the correlation coefficient, and
  set individual target energies for the respective subsystems, such that (i) a sum of the individual target energies is less than a total target energy, and (ii) the total margin energy is equal to the calculated total margin energy; and
a second communication interface configured to transmit, to the controller, control-instruction information for instruction of control of the facility device based on the individual target energies set by the processor,
wherein the controller controls the facility device such that the consumption of energy of the facility device is equal to the individual target energy.

2. The energy setting device according to claim 1, wherein the total target energy is designated by the reduction instruction,
the processor sets the individual target energies for the respective subsystems such that a higher correlation coefficient between individual energy histories provides a decrease in the sum of the individual target energies.

3. The energy setting device according to claim 2, wherein the processor
  sets, as the total margin energy, a value obtained by multiplying a predetermined coefficient by a maximum value among (i) a sum of individual actual energies of a combination of subsystems, of the subsystems, of which a correlation coefficient between the individual energy histories is greater than or equal to a predetermined threshold, the individual actual energies each being an actual value of the consumption energy of the corresponding subsystem, and (ii) each of the individual actual energies of the respective subsystems, and
  sets the individual target energy for the corresponding subsystem based on the total target energy and the total margin energy.

4. The energy setting device according to claim 3, wherein the processor sets, for each of the subsystems, as the individual target energy, a value obtained by subtracting, from a standard individual target energy, an individual margin energy that is a value obtained by multiplying an actual energy fraction by the total margin energy, the actual energy fraction of each of the subsystems being a fraction determined by dividing the individual actual energy of the respective subsystem by a total actual energy that is a sum of the individual actual energies for the respective subsystems, the standard individual target energy being obtained by multiplying the total target energy by the actual energy fraction.

5. The energy setting device according to claim 2, wherein the processor (i) sets, for each of the subsystems, an individual energy indicator value such that a higher correlation coefficient between an individual energy history of the subsystem and individual energy histories of other subsystems of the subsystems provides an increase in the individual energy indicator value, (ii) sets as the total margin energy a value obtained by multiplying a predetermined coefficient by a maximum value among the individual energy indicator values set for the respective subsystems, and (iii) sets the individual target energies for the respective subsystems from the total target energy and the total margin energy.

6. The energy setting device according to claim 5, wherein the processor
  sets, for each of the subsystems, as the individual target energy, a value obtained by subtracting an individual margin energy from a standard individual target energy, the standard individual target energy being a value obtained by multiplying the total target energy by an actual energy fraction for the respective subsystems that is a fraction determined by dividing an individual actual energy of a respective subsystem by a total actual energy that is a sum of the individual actual energies that are actual values of consumption energies for the respective subsystems, the individual margin energy being a value obtained by multiplying the total margin energy by an indicator value fraction that is a fraction determined by dividing the individual energy indicator value of the respective subsystem by a total energy indicator value that is a sum of the individual energy indicator values for the respective subsystems.

7. The energy setting device according to claim 6, wherein a second subsystem is selected from among the subsystems until all subsystems other than a first subsystem among the subsystems are selected as the second subsystem and a correction energy is found, the correction energy being a product of (i) a correlation coefficient between an individual energy history of the first subsystem and an individual energy history of the second subsystem and (ii) an individual actual energy of the second subsystem, an individual energy indicator value of the first subsystem is a sum of (i) an individual actual energy of the first subsystem and (ii) a sum of the correction energies.

8. The energy setting device according to claim 2, wherein the processor
finds an overall correlation coefficient for the entirety of the subsystems, based on (i) correlation coefficients between the individual energy histories between the subsystems and (ii) an actual energy fraction for each of the subsystems that is a fraction determined by dividing an individual actual energy of the respective subsystem by a total actual energy that is a sum of individual actual energies that are actual values of the consumption energies for the respective subsystems, and,
sets, as the total margin energy, a product obtained by multiplying a predetermined coefficient by the overall correlation coefficient and the total target energy, and sets the individual target energy for each of the subsystems based on the total target energy and the total margin energy.

9. The energy setting device according to claim 8, wherein products are found until all the subsystems are selected, as the first subsystem, from the subsystems, each of the products being a product of (i) an average value of correlation coefficients between the individual energy histories of the subsystems and the first subsystem and (ii) the actual energy fraction of the first subsystem, the overall correlation coefficient is a sum of the products.

10. The energy setting device according to claim 1, wherein
the first communication interface receives from a server reduction instruction information indicating the reduction instruction,
the processor sets the total target energy such that a higher correlation coefficient between individual energy histories that are histories of consumption energies for the respective subsystems provides an increase in the total margin energy, and
the first communication interface is further configured to transmit, to the server, total target energy, information indicating the total target energy set by the processor.

11. The energy setting device according to claim 10, wherein
the processor
sets, as the individual target energy, a first individual estimate energy that is an estimated energy in a case in which a predetermined electricity-saving control is executed for the corresponding subsystem,
selects, from the subsystems, a combination of subsystems of which a correlation coefficient between the individual energy histories is greater than or equal to a predetermined threshold,
sets, as the total margin energy, a value obtained by multiplying a predetermined coefficient by a maximum value among (i) a sum of the individual target energies set for the selected combination and (ii) the individual target energies of the respective subsystems, and
sets, as the total target energy, a value obtained by adding the total margin energy to a sum of the individual target energies set for the respective subsystems.

12. The energy setting device according to claim 1, wherein
the first communication interface receives from a server reduction instruction information indicating the reduction instruction,
the processor sets the total target reduction energy such that a higher correlation coefficient between individual energy histories that are histories of consumption energies for the respective subsystems provides a decrease in a total target reduction energy that is a target value of a reduction amount of a consumption energy of the entirety of subsystems, and
the first communication interface is further configured to transmit, to the server, reduction energy information indicating the total target reduction energy set by the processor.

13. The energy setting device according to claim 12, wherein the processor
for each of the subsystems, sets as the individual target energy a first individual estimate energy that is an estimated energy occurring when the subsystem executes predetermined energy-saving control,
for each of the subsystems, sets as an individual estimate reduction energy a value obtained by subtracting the first individual estimate energy from a second individual estimate energy that is an estimated energy occurring when the electricity-saving control is not executed,
selects, from among the subsystems, combinations for which a correlation coefficient among the individual energy histories is greater than or equal to a predetermined threshold,
sets as the total margin energy a value obtained by multiplying a predetermined coefficient by a maximum value among (i) a sum of the individual estimate reduction energies for the selected combination and (ii) the individual estimate reduction energy for each of the subsystems, and
sets as the total target reduction energy a value obtained by subtracting the total margin energy from a sum of the individual estimate reduction energies for the respective subsystems.

14. The energy setting device according to claim 1, wherein
the second communication interface is further configured to receive, from a power meter configured to measure the consumption energy for each of the subsystems, consumption energy information indicating (i) identification information of the subsystem and (ii) the measured consumption energy,
the energy setting device further comprises an energy history storage configured to, based on the consumption energy information received by the second communication interface, (i) generate energy history information indicating histories of the consumption energy occurring during a most recent predetermined period for each subsystem, and (ii) store the generated energy history information; and
the processor is further configured to, based on the energy history information stored by the energy history storage, determine a correlation coefficient among individual energy histories that are histories of the consumption energy for each subsystem.

15. The energy setting device according to claim 1, wherein
the subsystems are defined in accordance with type of the facility device.

16. The energy setting device according to claim 1, wherein
the subsystems are defined in accordance with an installation region of the facility device.

17. An energy setting method comprising:
receiving a reduction instruction for reduction in energy of an entirety of subsystems, each subsystem comprising a facility device and a controller configured to control the facility device; and
upon receiving the reduction instruction,
determining a correlation coefficient between individual energy histories that are histories of consumption energies for the respective subsystems,
calculating a total margin energy, the total margin energy being a difference between a total target energy and the sum of the individual target energies,
wherein the individual target energies are each a target value of a consumption energy for a corresponding subsystem of the subsystems,
wherein the total target energy is a target value of a consumption energy of an entirety of the subsystems, and wherein the calculated total margin energy is determined based upon the correlation coefficient, with the total margin energy increasing with an increase in the correlation coefficient, and setting each of individual target energies for the respective subsystems such that (i) a sum of the individual target energies that are target values of consumption energies for the respective subsystems is smaller than a total target energy, and (ii) the total margin energy is equal to the calculated total margin energy; and transmitting, to the controller, control-instruction information for instruction of control of the facility device based on the individual target energies, wherein the controller controls the facility device such that the consumption of energy of the facility device is equal to the individual target energy.

18. A non-transitory computer-readable recording medium storing a program for causing a computer to function as:

a first communication interface configured to receive a reduction instruction for reduction in electrical energy of an entirety of subsystems, each subsystem comprising a facility device and a controller configured to control the facility device;

a processor configured to, when the first communication interface receives the reduction instruction:

determine a correlation coefficient between individual energy histories that are histories of consumption energies for the respective subsystems, calculate a total margin energy, the total margin energy being a difference between a total target energy and the sum of the individual target energies, wherein the individual target energies are each a target value of a consumption energy for a corresponding subsystem of the subsystems, wherein the total target energy is a target value of a consumption energy of an entirety of the subsystems, and wherein the calculated total margin energy is determined based upon the correlation coefficient, with the total margin energy increasing with an increase in the correlation coefficient, and set individual target energies for the respective subsystems, the individual target energies each being a target value of a consumption energy for a corresponding subsystem of the subsystems, such that (i) a sum of the individual target energies is less than a total target energy, and (ii) total margin energy is equal to the calculated total margin energy; and a second communication interface configured to transmit, to the controller, control-instruction information for instruction of control of the facility device based on the individual target energies set by the processor, wherein the controller controls the facility device such that the consumption of energy of the facility device is equal to the individual target energy.

* * * * *